United States Patent
Damnjanovic et al.

(10) Patent No.: US 11,843,982 B2
(45) Date of Patent: Dec. 12, 2023

(54) LAYER 1 AND LAYER 2 MOBILITY IN MULTIPLE DISTRIBUTED UNIT DEPLOYMENTS

(71) Applicant: QUALCOMM Incorporated, San Diego, CA (US)

(72) Inventors: Jelena Damnjanovic, Del Mar, CA (US); Tao Luo, San Diego, CA (US); Aleksandar Damnjanovic, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 269 days.

(21) Appl. No.: 17/121,514

(22) Filed: Dec. 14, 2020

(65) Prior Publication Data

US 2022/0191749 A1    Jun. 16, 2022

(51) Int. Cl.
*H04W 36/00* (2009.01)
*H04W 56/00* (2009.01)
*H04W 76/27* (2018.01)
*H04W 80/02* (2009.01)

(52) U.S. Cl.
CPC . *H04W 36/0066* (2013.01); *H04W 36/00837* (2018.08); *H04W 56/001* (2013.01); *H04W 76/27* (2018.02); *H04W 80/02* (2013.01)

(58) Field of Classification Search
CPC ....... H04W 36/0066; H04W 36/00837; H04W 76/27; H04W 56/001; H04W 80/02
USPC .......................................................... 370/331
See application file for complete search history.

(56) References Cited

U.S. PATENT DOCUMENTS

| | | | |
|---|---|---|---|
| 2017/0359848 A1* | 12/2017 | Tenny | H04W 36/023 |
| 2019/0069333 A1* | 2/2019 | Kim | H04W 76/15 |
| 2019/0387561 A1 | 12/2019 | Paladugu et al. | |
| 2020/0015132 A1* | 1/2020 | Liu | H04W 36/0033 |
| 2020/0351971 A1* | 11/2020 | Fiorani | H04W 48/14 |
| 2021/0274535 A1 | 9/2021 | Yi et al. | |

FOREIGN PATENT DOCUMENTS

WO    WO-2020041972 A1    3/2020

OTHER PUBLICATIONS

International Search Report and Written Opinion—PCT/US2021/072408—ISA/EPO—dated Mar. 4, 2022.

(Continued)

*Primary Examiner* — Intekhaab A Siddiquee
(74) *Attorney, Agent, or Firm* — Harrity & Harrity, LLP

(57) ABSTRACT

Various aspects of the present disclosure generally relate to wireless communication. In some aspects, a user equipment (UE) may determine to switch from a first cell of a first distributed unit (DU) to a second cell of a second DU, wherein the first DU and the second DU are included in a set of DUs of a central unit (CU). The UE may communicate, using layer 1 (L1) or layer 2 (L2) signaling to change an activation status of at least one cell of the first DU or the second DU. The UE may switch from the first cell to the second cell in connection with the change to the activation status of the at least one cell of the first DU or the second DU. Numerous other aspects are provided.

30 Claims, 14 Drawing Sheets

(56) References Cited

OTHER PUBLICATIONS

Qualcomm Incorporated: "Enhancements on Multi-Beam Operation", 3GPP TSG RAN WG1 Meeting #103-e, 3GPP Draft, R1-2009250, 3rd Generation Partnership Project (3GPP), Mobile Competence Centre, 650, Route Des Lucioles, F-06921 Sophia-Antipolis Cedex, France, vol. RAN WG1, No. e-meeting, Oct. 26, 2020-Nov. 13, 2020, 12 Pages, Oct. 24, 2020 (Oct. 24, 2020), XP051946913, Retrieved from the Internet: URL: https://www.3gpp.org/ftp/TSG_RAN/WG1_RL1/TSGR1_103-e/Docs/R1-2009250.zip, R1-2009250 Enhancements on Multi-beam Operation.docx [retrieved on Oct. 24, 2020], p. 8-p. 9, Sections 1, 1.Issue 1, chapter 2.

\* cited by examiner

LAYER 1 AND LAYER 2 MOBILITY IN MULTIPLE DISTRIBUTED UNIT DEPLOYMENTS

FIELD OF THE DISCLOSURE

Aspects of the present disclosure generally relate to wireless communication and to techniques and apparatuses for layer 1 (L1) and layer 2 (L2) (L1/L2) mobility in multiple distributed unit (DU) (multi-DU) deployments.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining to switch from a first cell of a first distributed unit (DU) to a second cell of a second DU, wherein the first DU and the second DU are included in a set of DUs of a central unit (CU); communicating, using layer 1 (L1) or layer 2 (L2) signaling, with at least one of the first DU or the second DU to change an activation status of at least one cell of the first DU or the second DU based at least in part on determining to switch from the first cell to the second cell; and switching from the first cell to the second cell in connection with the change to the activation status of the at least one cell of the first DU or the second DU.

In some aspects, a method of wireless communication performed by a wireless communication device includes communicating, using L1 or L2 signaling, with at least one of a CU, a DU, or a UE to change an activation status of at least one cell; and switching the UE from a first cell to a second cell in connection with the change to the activation status of the at least one cell.

In some aspects, a UE for wireless communication includes a memory; and one or more processors operatively coupled to the memory, the memory and the one or more processors configured to: determine to switch from a first cell of a first DU to a second cell of a second DU, wherein the first DU and the second DU are included in a set of DUs of a CU; communicate, using L1 or L2 signaling, with at least one of the first DU or the second DU to change an activation status of at least one cell of the first DU or the second DU based at least in part on determining to switch from the first cell to the second cell; and switch from the first cell to the second cell in connection with the change to the activation status of the at least one cell of the first DU or the second DU.

In some aspects, a wireless communication device for wireless communication includes a memory; and one or more processors operatively coupled to the memory, the memory and the one or more processors configured to: communicate, using L1 or L2 signaling, with at least one of a CU, a DU, or a UE to change an activation status of at least one cell; and switch the UE from a first cell to a second cell in connection with the change to the activation status of the at least one cell.

In some aspects, a non-transitory computer-readable medium storing a set of instructions for wireless communication includes one or more instructions that, when executed by one or more processors of a UE, cause the UE to: determine to switch from a first cell of a first DU to a second cell of a second DU, wherein the first DU and the second DU are included in a set of DUs of a CU; communicate, using L1 or L2 signaling, with at least one of the first DU or the second DU to change an activation status of at least one cell of the first DU or the second DU based at least in part on determining to switch from the first cell to the second cell; and switch from the first cell to the second cell in connection with the change to the activation status of the at least one cell of the first DU or the second DU.

In some aspects, a non-transitory computer-readable medium storing a set of instructions for wireless communication includes one or more instructions that, when executed by one or more processors of a wireless communication device, cause the wireless communication device to: communicate, using L1 or L2 signaling, with at least one of a CU, a DU, or a UE to change an activation status of at least one cell; and switch the UE from a first cell to a second cell in connection with the change to the activation status of the at least one cell.

In some aspects, an apparatus for wireless communication includes means for determining to switch from a first cell of a first DU to a second cell of a second DU, wherein the first DU and the second DU are included in a set of DUs of a CU; means for communicating, using L1 or L2 signaling, with at least one of the first DU or the second DU to change an activation status of at least one cell of the first DU or the second DU based at least in part on determining to switch from the first cell to the second cell; and means for switching from the first cell to the second cell in connection with the change to the activation status of the at least one cell of the first DU or the second DU.

In some aspects, an apparatus for wireless communication includes means for communicating, using L1 or L2 signaling, with at least one of a CU, a DU, or a UE to change an activation status of at least one cell; and means for switching the UE from a first cell to a second cell in connection with the change to the activation status of the at least one cell.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
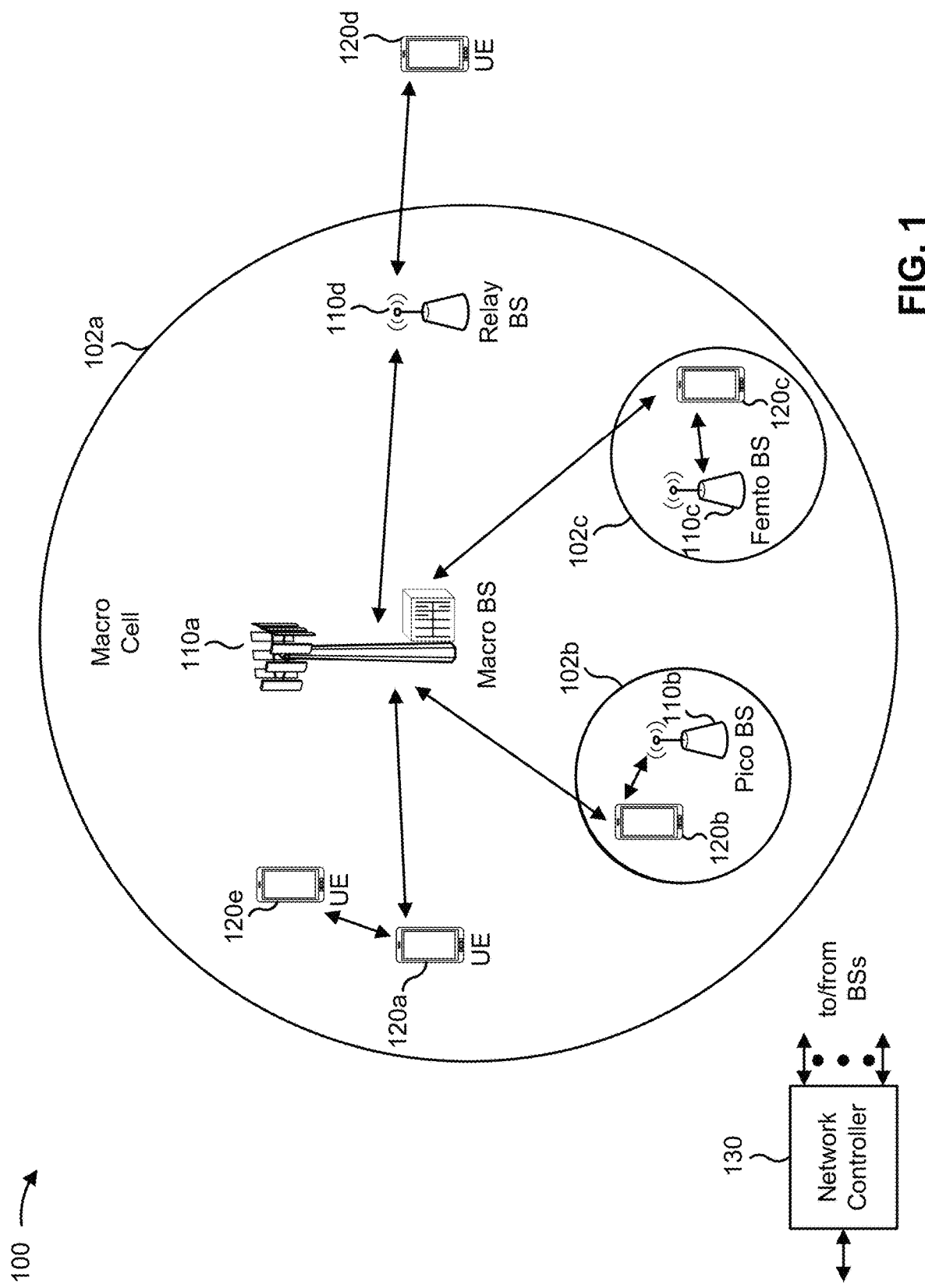
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
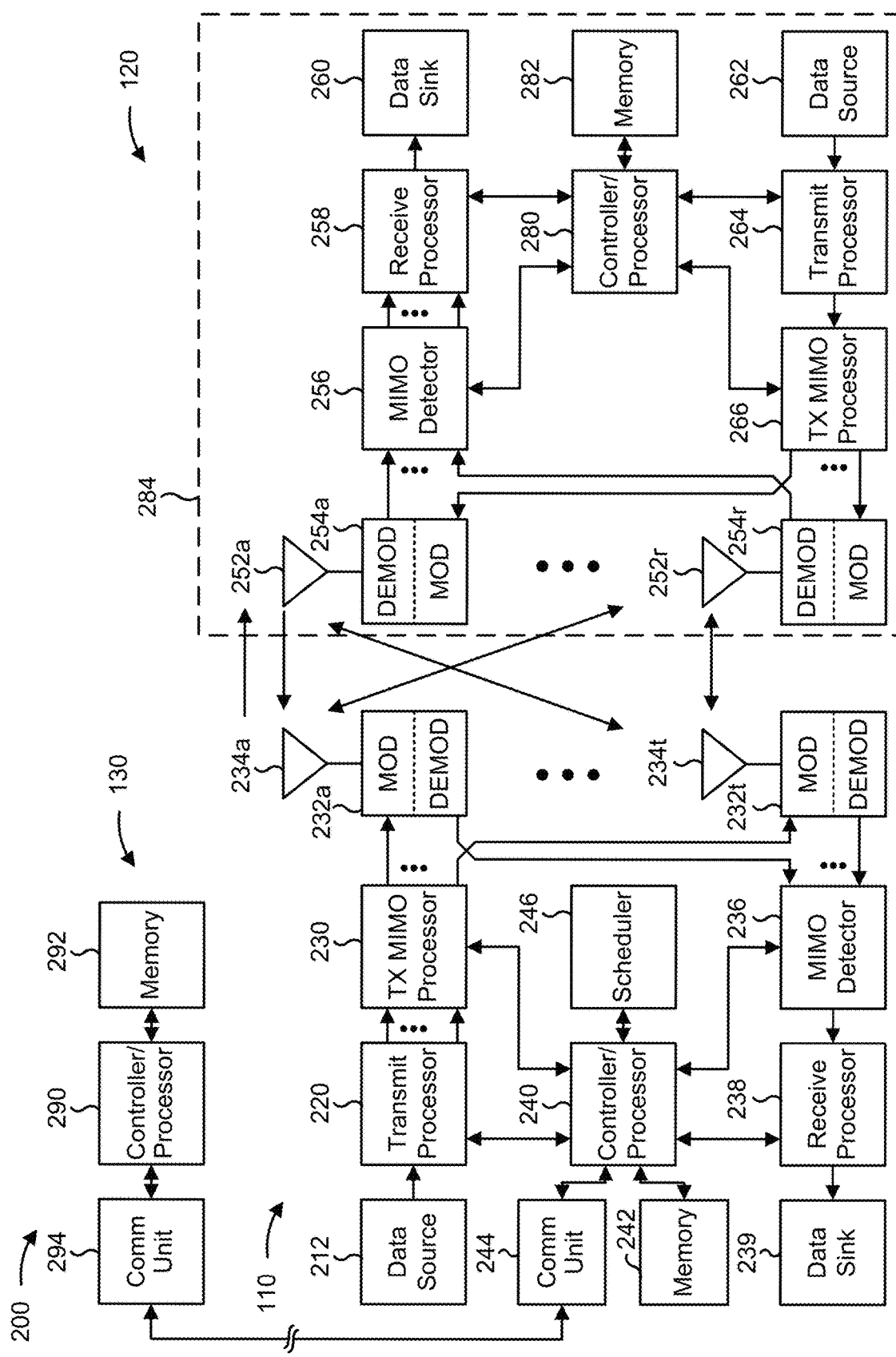
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 8A-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 8A-10.

Controller/processor 240 of base station 110, controller/processor 280 of UE 120, and/or any other component(s) of FIG. 2 may perform one or more techniques associated with mobility in a multi-distributed unit (DU) (multi-DU) deployment, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, a UE includes means for determining to switch from a first cell of a DU to a second cell of a second DU, wherein the first DU and the second DU are included in a set of DUs of a central unit (CU); means for communicating, using layer 1 (L1) or layer 2 (L2) signaling, with at least one of the first DU or the second DU to change an activation status of at least one cell of the first DU or the second DU based at least in part on determining to switch from the first cell to the second cell; or means for switching from the first cell to the second cell in connection with the change to the activation status of the at least one cell of the first DU or the second DU. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for communicating to change the activation status of the at least one cell based at least in part on a type of the particular cell set. In some aspects, the UE includes means for communicating to select a beam of the second cell. In some aspects, the UE includes means for communicating with a first one of the first DU or the second DU to control a parameter of the at least one cell, wherein the at least one cell is associated with a second one of the first DU or the second DU. In some aspects, the UE includes means for communicating with the at least one of the first DU or the second DU to change the activation status of the at least one cell based at least in part on at least one of:

In some aspects, the UE includes means for receiving, from one of the first DU or the second DU, cell management signaling regarding a set of cells of the one of the first DU or the second DU. In some aspects, the UE includes means for receiving, from a first one of the first DU or the second DU, cell management signaling regarding a set of cells of a second one of the first DU or the second DU. In some aspects, the UE includes means for communicating beam selection information with the at least one of the first DU or the second DU to select from a first beam of the first cell to a second beam of the second cell. In some aspects, the UE includes means for receiving signaling to monitor or measure one or more beams of one or more cells of an L1/L2 activated cell set.

In some aspects, the UE includes means for receiving signaling to monitor a synchronization signal block of one or more cells of an L1/L2 activated cell set. In some aspects, the UE includes means for receiving or transmitting control information on one or more beams of one or more cells of an L1/L2 activated cell set. In some aspects, the UE includes means for receiving scheduling information to schedule a data communication on one or more beams of one or more cells of an L1/L2 activated cell set. In some aspects, the UE includes means for communicating beam selection information identifying a selection of one or more beams of one or more cells of an L1/L2 activated cell set.

In some aspects, the UE includes means for selecting a particular cell of an L1/L2 candidate cell set and means for autonomously adding the particular cell to an L1/L2 activated cell set. In some aspects, the UE includes means for selecting the particular cell based at least in part on a channel quality or a channel load. In some aspects, the UE includes means for receiving, on a non-serving cell DU, L1/L2 signaling identifying the change to the activation status of the at least one cell based at least in part on a cross-DU selection of the at least one cell. In some aspects, the UE includes means for communicating to change an activation status of a group of carriers, wherein the group of carriers includes at least one component carrier corresponding to the at least one cell.

In some aspects, a wireless communication device includes means for communicating, using L1 or L2 signaling, with at least one of a CU, a DU, or a UE, to change an activation status of at least one cell; or means for switching the UE from a first cell to a second cell in connection with the change to the activation status of the at least one cell. In some aspects, the means for the wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the wireless communication device includes means for communicating, using further L1/L2 signaling, to select a beam for the UE. In some aspects, the wireless communication device includes means for communicating to change the activation status of the at least one cell based at least in part on a type of the particular cell set. In some aspects, the wireless communication device includes means for communicating to select a beam of the second cell. In some aspects, the wireless communication device includes means for communicating with a first DU of the CU to control a parameter of the at least one cell, wherein the at least one cell is associated with a DU of the CU. In some aspects, the wireless communication device includes means for communicating to change the activation status of the at least one cell based at least in part on at least one of: a signal quality parameter, a loading parameter, a location parameter, or a mobility direction parameter.

In some aspects, the wireless communication device includes means for receiving, from one of the first DU or the second DU, cell management signaling regarding a set of cells of the one of the first DU or the second DU. In some aspects, the wireless communication device includes means for receiving, from a first one of the first DU or the second DU, cell management signaling regarding a set of cells of a second one of the first DU or the second DU. In some aspects, the wireless communication device includes means for communicating beam selection information with the at least one of the first DU or the second DU to select from a first beam of the first cell to a second beam of the second cell.

In some aspects, the wireless communication device includes means for receiving signaling to monitor or measure one or more beams of one or more cells of an L1/L2 activated cell set. In some aspects, the wireless communication device includes means for receiving signaling to monitor a synchronization signal block of one or more cells of an L1/L2 activated cell set. In some aspects, the wireless communication device includes means for receiving or transmitting control information on one or more beams of one or more cells of an L1/L2 activated cell set.

In some aspects, the wireless communication device includes means for receiving scheduling information to schedule a data communication on one or more beams of one or more cells of an L1/L2 activated cell set. In some aspects, the wireless communication device includes means for communicating beam selection information identifying a selection of one or more beams of one or more cells of an L1/L2 activated cell set. In some aspects, the wireless communication device includes means for selecting a particular cell of an L1/L2 candidate cell set, and means for autonomously adding the particular cell to an L1/L2 activated cell set.

In some aspects, the wireless communication device includes means for selecting the particular cell based at least in part on a channel quality or a channel load. In some aspects, the wireless communication device includes means for receiving, on a non-serving cell DU, L1/L2 signaling identifying the change to the activation status of the at least one cell based at least in part on a cross-DU selection of the at least one cell. In some aspects, the wireless communication device includes means for communicating to change an activation status of a group of carriers, wherein the group of carriers includes at least one component carrier corresponding to the at least one cell.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
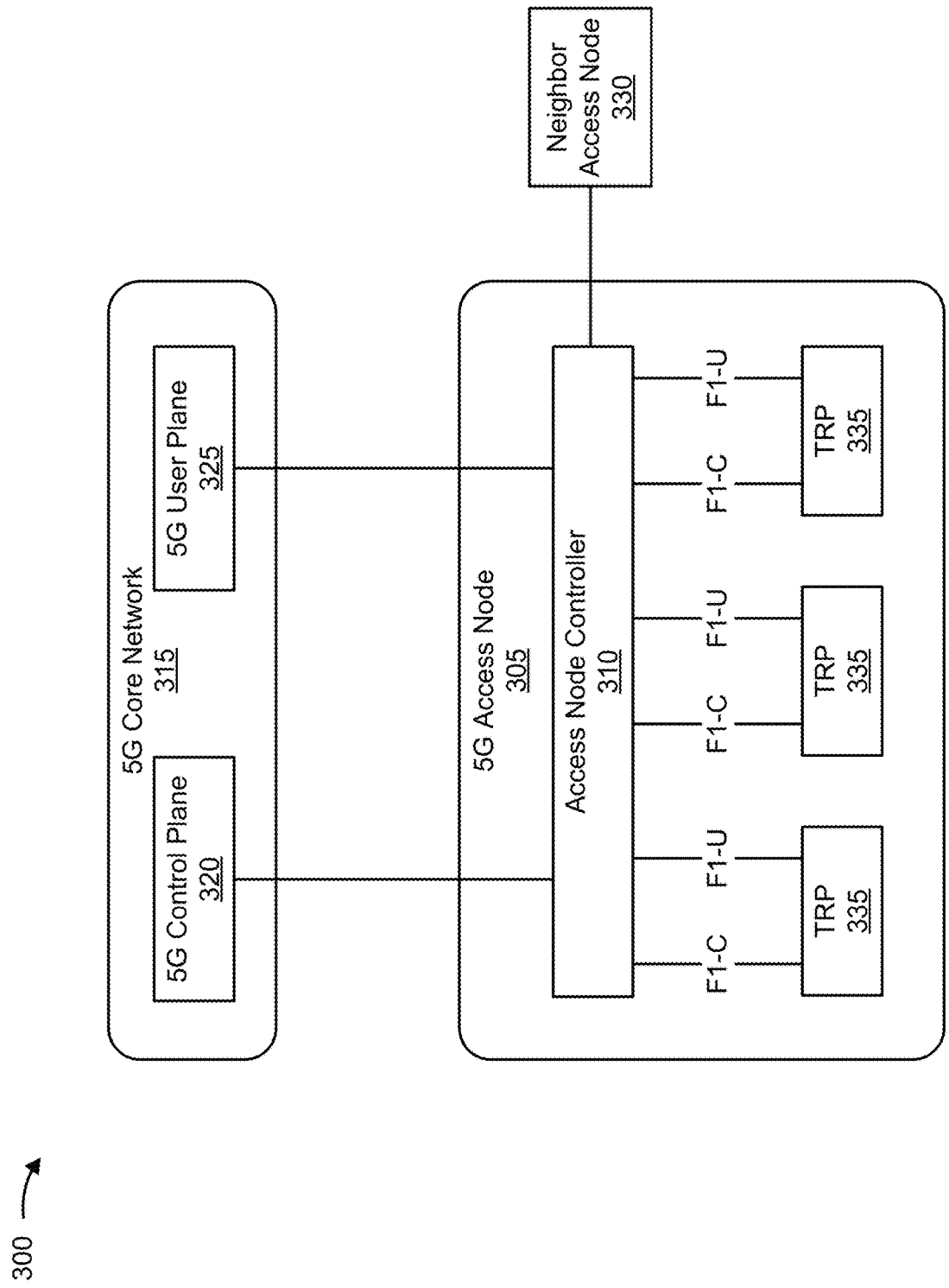
FIG. 3 is a diagram illustrating an example of a distributed radio access network (RAN), in accordance with various aspects of the present disclosure.

FIG. 3 illustrates an example logical architecture of a distributed radio access network (RAN) 300, according to aspects of the present disclosure.

A 5G access node 305 may include an access node controller 310. The access node controller 310 may be a CU of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305, an LTE access node, and/or the like) may terminate at the access node controller 310.

The access node controller 310 may include and/or may communicate with one or more TRPs 335 (e.g., via an F1 Control (F1-C) interface and/or an F1 User (F1-U) interface). A TRP 335 may be a DU of the distributed RAN 300. In some aspects, the TRP 335 may correspond to a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (e.g., access node controller 310) and/or one or more DUs (e.g., one or more TRPs 335). In some cases, a TRP 335 may be referred to as a cell, a panel, an antenna array, an array, and/or the like.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, a medium access control (MAC) layer, and/or the like may be configured to terminate at the access node controller 310 or at a TRP 335.

In some aspects, multiple TRPs 335 may transmit communications (e.g., the same communication or different communications) in the same transmission time interval (TTI) (e.g., a slot, a mini-slot, a subframe, a symbol, and/or the like) or different TTIs using different quasi-co-location (QCL) relationships (e.g., different spatial parameters, different transmission configuration indicator (TCI) states, different precoding parameters, different beamforming parameters, and/or the like). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120.

As indicated above, FIG. 3 is provided as an example. Other examples may differ from what was described with regard to FIG. 3.

Figure 4:
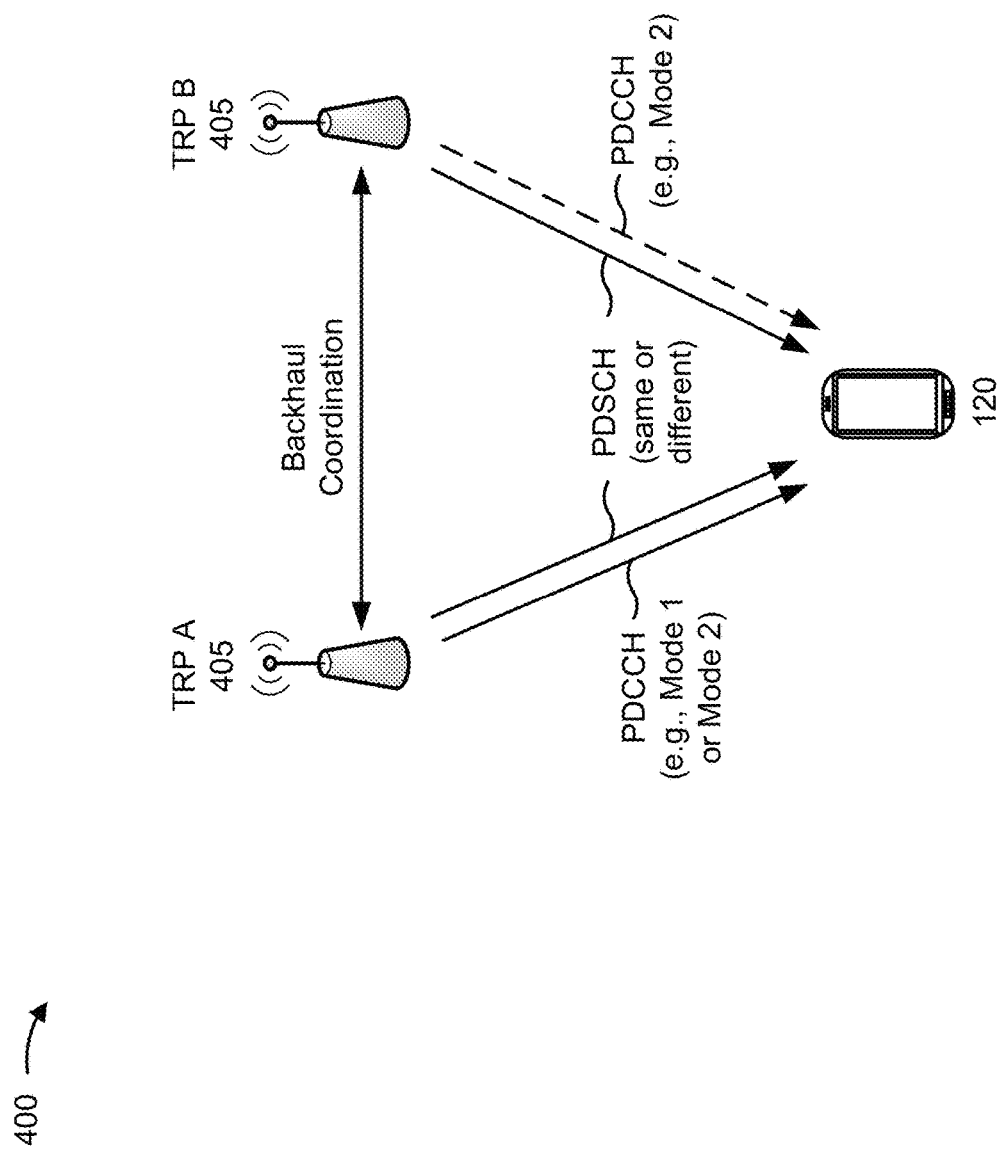
FIG. 4 is a diagram illustrating an example of multi-transmit receive point (TRP) communication, in accordance with various aspects of the present disclosure.

FIG. 4 is a diagram illustrating an example 400 of multi-TRP communication (sometimes referred to as multi-panel communication), in accordance with various aspects of the present disclosure. As shown in FIG. 4, multiple TRPs 405 may communicate with the same UE 120. A TRP 405 may correspond to a TRP 335 described above in connection with FIG. 3.

The multiple TRPs 405 (shown as TRP A and TRP B) may communicate with the same UE 120 in a coordinated manner (e.g., using coordinated multipoint transmissions and/or the like) to improve reliability, increase throughput, and/or the like. The TRPs 405 may coordinate such communications via an interface between the TRPs 405 (e.g., a backhaul interface, an access node controller 310, and/or the like). The interface may have a smaller delay and/or higher capacity when the TRPs 405 are co-located at the same base station 110 (e.g., when the TRPs 405 are different antenna arrays or panels of the same base station 110), and may have a larger delay and/or lower capacity (as compared to co-location) when the TRPs 405 are located at different base stations 110. The different TRPs 405 may communicate with the UE 120 using different QCL relationships (e.g., different TCI states), different DMRS ports, different layers (e.g., of a multi-layer communication), and/or the like.

In a first multi-TRP transmission mode (e.g., Mode 1), a single physical downlink control channel (PDCCH) may be used to schedule downlink data communications for a single physical downlink shared channel (PDSCH). In this case, multiple TRPs 405 (e.g., TRP A and TRP B) may transmit communications to the UE 120 on the same PDSCH. For example, a communication may be transmitted using a single codeword with different spatial layers for different TRPs 405 (e.g., where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (e.g., using different sets of layers). In either case, different TRPs 405 may use different QCL relationships (e.g., different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0, DCI format 1_1, and/or the like) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 405, and a second PDCCH may schedule a second codeword to be transmitted by a second TRP 405. Furthermore, first DCI (e.g., transmitted by the first TRP 405) may schedule a first PDSCH communication associated with a first set of DMRS ports with a first QCL relationship (e.g., indicated by a first TCI state) for the first TRP 405, and second DCI (e.g., transmitted by the second TRP 405) may schedule a second PDSCH communication associated with a second set of DMRS ports with a second QCL relationship (e.g., indicated by a second TCI state) for the second TRP 405. In this case, DCI (e.g., having DCI format 1_0, DCI format 1_1, and/or the like) may indicate a corresponding TCI state for a TRP 405 corresponding to the DCI. The TCI field of a DCI indicates the corresponding TCI state (e.g., the TCI field of the first DCI indicates the first TCI state and the TCI field of the second DCI indicates the second TCI state).

As indicated above, FIG. 4 is provided as an example. Other examples may differ from what is described with respect to FIG. 4.

Figure 5:
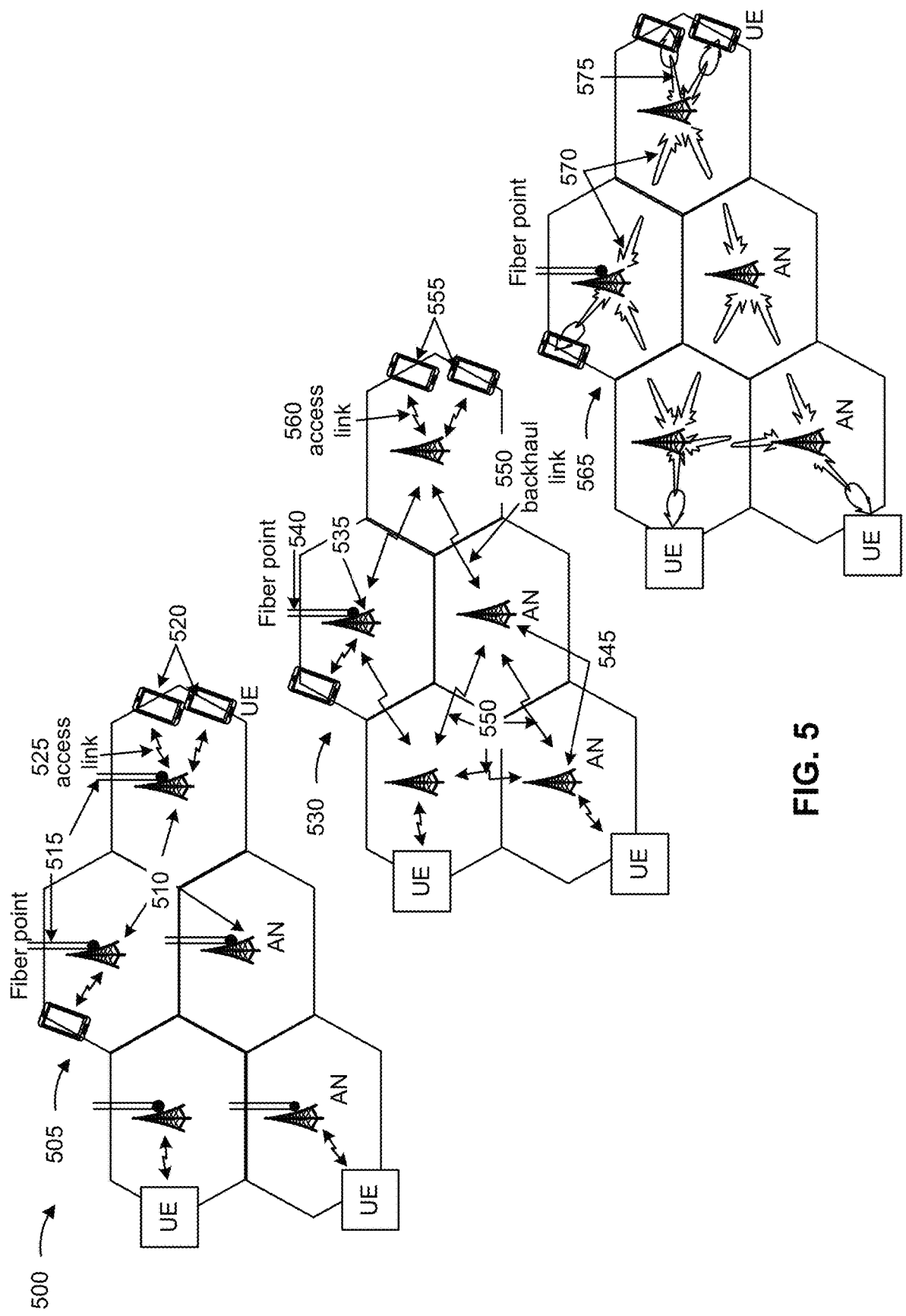
FIG. 5 is a diagram illustrating an example of RANs, in accordance with various aspects of the present disclosure.

FIG. 5 is a diagram illustrating examples 500 of radio access networks, in accordance with various aspects of the disclosure.

As shown by reference number 505, a traditional (e.g., 3G, 4G, LTE, and/or the like) radio access network may include multiple base stations 510 (e.g., access nodes (AN)), where each base station 510 communicates with a core network via a wired backhaul link 515, such as a fiber connection. A base station 510 may communicate with a UE 520 via an access link 525, which may be a wireless link. In some aspects, a base station 510 shown in FIG. 5 may be a base station 110 shown in FIG. 1. In some aspects, a UE 520 shown in FIG. 5 may be a UE 120 shown in FIG. 1.

As shown by reference number 530, a radio access network may include a wireless backhaul network, sometimes referred to as an integrated access and backhaul (IAB) network. In an TAB network, at least one base station is an anchor base station 535 that communicates with a core network via a wired backhaul link 540, such as a fiber connection. An anchor base station 535 may also be referred to as an IAB donor (or IAB-donor). The IAB network may include one or more non-anchor base stations 545, sometimes referred to as relay base stations or IAB nodes (or IAB-nodes). The non-anchor base station 545 may communicate directly or indirectly with the anchor base station 535 via one or more backhaul links 550 (e.g., via one or more non-anchor base stations 545) to form a backhaul path to the core network for carrying backhaul traffic. Backhaul link 550 may be a wireless link. Anchor base station(s) 535 and/or non-anchor base station(s) 545 may communicate with one or more UEs 555 via access links 560, which may be wireless links for carrying access traffic. In some aspects, an anchor base station 535 and/or a non-anchor base station 545 shown in FIG. 5 may be a base station 110 shown in FIG. 1. In some aspects, a UE 555 shown in FIG. 5 may be a UE 120 shown in FIG. 1.

As shown by reference number 565, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 570 between base stations may use millimeter wave signals to carry information and/or may be directed toward a target base station using beamforming and/or the like. Similarly, the wireless access links 575 between a UE and a base station may use millimeter wave signals and/or may be directed toward a target wireless node (e.g., a UE and/or a base station). In this way, inter-link interference may be reduced.

The configuration of base stations and UEs in FIG. 5 is shown as an example, and other examples are contemplated. For example, one or more base stations illustrated in FIG. 5 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 5 is provided as an example. Other examples may differ from what is described with regard to FIG. 5.

Figure 6:
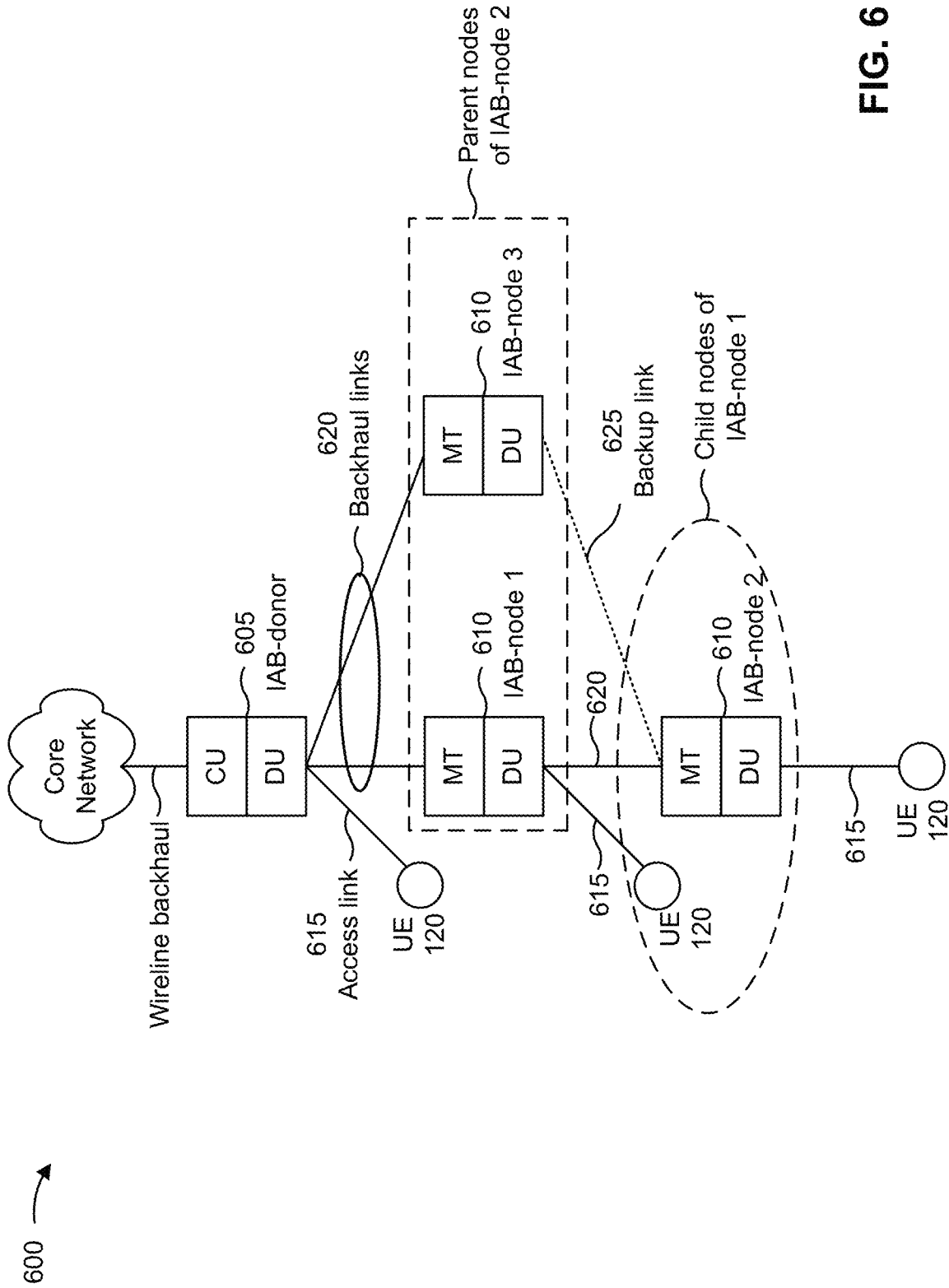
FIG. 6 is a diagram illustrating an example of an integrated access and backhauling (IAB) network architecture, in accordance with various aspects of the present disclosure.

FIG. 6 is a diagram illustrating an example 600 of an IAB network architecture, in accordance with various aspects of the disclosure.

As shown in FIG. 6, an IAB network may include an IAB donor 605 (shown as IAB-donor) that connects to a core network via a wired connection (shown as a wireline backhaul). For example, an Ng interface of an IAB donor 605 may terminate at a core network. Additionally, or alternatively, an IAB donor 605 may connect to one or more devices of the core network that provide a core access and mobility management function (AMF). In some aspects, an IAB donor 605 may include a base station 110, such as an anchor base station, as described above in connection with 5. As shown, an IAB donor 605 may include a CU, which may perform access node controller (ANC) functions, AMF functions, and/or the like. The CU may configure a DU of the IAB donor 605 and/or may configure one or more IAB nodes 610 (e.g., a mobile terminal (MT) and/or a DU of an IAB node 610) that connect to the core network via the IAB donor 605. Thus, a CU of an IAB donor 605 may control and/or configure the entire IAB network that connects to the core network via the IAB donor 605, such as by using control messages and/or configuration messages (e.g., a radio resource control (RRC) configuration message, an F1 application protocol (F1AP) message, and/or the like).

As further shown in FIG. 6, the IAB network may include IAB nodes 610 (shown as IAB-node 1, IAB-node 2, and IAB-node 3) that connect to the core network via the IAB donor 605. As shown, an IAB node 610 may include MT functions (also sometimes referred to as UE functions (UEF)) and may include DU functions (also sometimes referred to as access node functions (ANF)). The MT functions of an IAB node 610 (e.g., a child node) may be controlled and/or scheduled by another IAB node 610 (e.g., a parent node of the child node) and/or by an IAB donor 605. The DU functions of an IAB node 610 (e.g., a parent node) may control and/or schedule other IAB nodes 610 (e.g., child nodes of the parent node) and/or UEs 120. Thus, a DU may be referred to as a scheduling node or a scheduling component, and an MT may be referred to as a scheduled node or a scheduled component. In some aspects, an IAB donor 605 may include DU functions and not MT functions. That is, an IAB donor 605 may configure, control, and/or schedule communications of IAB nodes 610 and/or UEs 120. A UE 120 may include only MT functions, and not DU functions. That is, communications of a UE 120 may be controlled and/or scheduled by an IAB donor 605 and/or an IAB node 610 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 605 or an IAB node 610, and a child node may be an IAB node 610 or a UE 120. Communications of an MT function of a child node may be controlled and/or scheduled by a parent node of the child node.

As further shown in FIG. 6, a link between a UE 120 (e.g., which only has MT functions, and not DU functions) and an IAB donor 605, or between a UE 120 and an IAB node 610, may be referred to as an access link 615. Access link 615 may be a wireless access link that provides a UE 120 with radio access to a core network via an IAB donor 605, and optionally via one or more IAB nodes 610. Thus, the network illustrated in 6 may be referred to as a multi-hop network or a wireless multi-hop network.

As further shown in FIG. 6, a link between an IAB donor 605 and an IAB node 610 or between two IAB nodes 610 may be referred to as a backhaul link 620. Backhaul link 620 may be a wireless backhaul link that provides an IAB node 610 with radio access to a core network via an IAB donor 605, and optionally via one or more other IAB nodes 610. In an IAB network, network resources for wireless communications (e.g., time resources, frequency resources, spatial resources, and/or the like) may be shared between access links 615 and backhaul links 620. In some aspects, a backhaul link 620 may be a primary backhaul link or a secondary backhaul link (e.g., a backup backhaul link). In some aspects, a secondary backhaul link may be used if a primary backhaul link fails, becomes congested, becomes overloaded, and/or the like. For example, a backup link 625 between IAB-node 2 and IAB-node 3 may be used for backhaul communications if a primary backhaul link between IAB-node 2 and IAB-node 1 fails. As used herein, a node or a wireless node may refer to an IAB donor 605 or an IAB node 610.

As indicated above, FIG. 6 is provided as an example. Other examples may differ from what is described with regard to FIG. 6.

Figure 7:
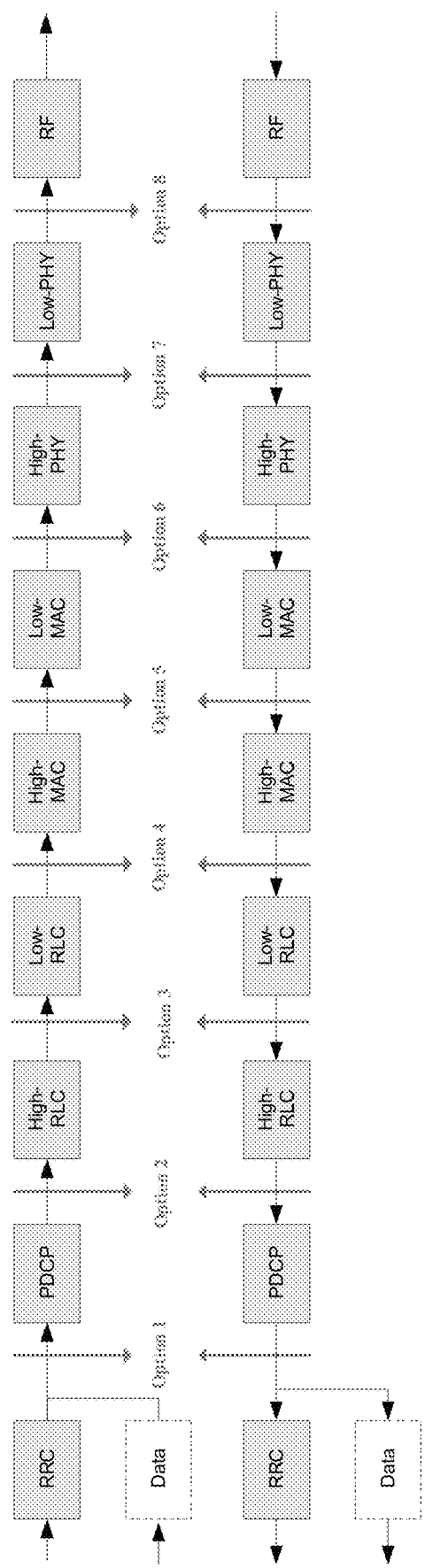
FIG. 7 is a diagram illustrating an example of a user plane protocol stack and a control plane protocol stack for a central unit (CU) and a distributed unit (DU), in accordance with various aspects of the present disclosure.

FIG. 7 is a diagram illustrating an example 700 of a user plane protocol stack and a control plane protocol stack for a CU and a DU, in accordance with various aspects of the present disclosure.

The protocol stack may include, for transmit chains on an uplink and a downlink, respective radio frequency (RF) layers, physical (PHY) layers (e.g., lower PHY layers (Low-PHY) and upper PHY layers (High-PHY)), MAC layers (e.g., lower MAC layers (Low-MAC) and upper MAC layers (High-MAC), RLC layers (e.g., lower RLC layers (Low-RLC) and upper RLC layers (High-RLC)), PDCP layers, and RRC layers. Other layers (not shown) may include service data adaptation protocol (SDAP) layers or a non-access stratum (NAS) layer, among other examples. Generally, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than the RRC layer. An application (APP) layer (not shown) may be higher than the SDAP/PDCP/RLC/MAC layer. In some cases, an entity may handle the services and functions of a given layer (e.g., a PDCP entity may handle the services and functions of the PDCP layer), though the description herein refers to the layers themselves as handling the services and functions.

The RRC layer may handle communications related to configuring and operating a UE, such as: broadcast of system information related to the access stratum (AS) and the NAS; paging initiated by the 5GC or the NG-RAN; establishment, maintenance, and release of an RRC connection between the UE and the NG-RAN, including addition, modification, and release of carrier aggregation, as well as addition, modification, and release of dual connectivity; security functions including key management; establishment, configuration, maintenance, and release of signaling radio bearers (SRBs) and data radio bearers (DRBs); mobility functions (e.g., handover and context transfer, UE cell selection and reselection and control of cell selection and reselection, inter-RAT mobility); quality of service (QoS) management functions; UE measurement reporting and control of the reporting; detection of and recovery from radio link failure; and NAS message transfer between the NAS layer and the lower layers of the UE 120. The RRC layer is frequently referred to as Layer 3 (L3).

The SDAP layer, PDCP layer, RLC layer, and MAC layer may be collectively referred to as Layer 2 (L2). Thus, in some cases, the SDAP, PDCP, RLC, and MAC layers are referred to as sublayers of L2. In some cases, L2 may include other layers, different layers, or a different combination of layers. For example, L2 may include a data link layer, such as a logical link control (LLC) layer, a point-to-point protocol (PPP) layer, among other examples. In some aspects, L2 may include a first set of services, layers, or sub-layers defined with respect to Layer 1 (L1), as described below. For example, depending on the context, L2 may include a first set of sub-layers that are higher on a protocol stack than a second set of sub-layers of L1. Similarly, in some aspects, L2 may include a first set of services, layers, or sub-layers that are defined with respect to Layer 3 (L3). For example, depending on the context, L2 may include a first set of sub-layers that are lower on a protocol stack than a second set of sub-layers of L3. In some aspects, L2 may be a layer in which communication of frames occurs.

On the transmitting side (e.g., if a UE is transmitting an uplink communication or a BS is transmitting a downlink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some aspects, the RRC/NAS layer may generate control information to be transmitted and may map the control information to one or more radio bearers for provision to the PDCP layer.

The SDAP layer, or the RRC/NAS layer, may map QoS flows or control information to radio bearers. Thus, the SDAP layer may handle QoS flows on the transmitting side. The SDAP layer may provide the QoS flows to the PDCP layer via the corresponding radio bearers. The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is required), PDCP protocol data unit (PDU) routing (in case of split bearers), retransmission of PDCP service data units (SDUs), ciphering and deciphering, PDCP SDU discard (e.g., in accordance with a timer, as described elsewhere herein), PDCP re-establishment and data recovery for RLC acknowledged mode (AM), and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

The PDCP layer may provide data, in the form of PDCP PDUs, to the RLC layer via RLC channels. The RLC layer may handle transfer of upper layer PDUs to the MAC and/or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from transport blocks (TBs) delivered to/from the physical layer on transport channels, scheduling information reporting, error correction through hybrid ARQ (HARD), priority handling between UEs by means of dynamic scheduling, priority handling between logical channels of one UE by means of logical channel prioritization, and padding.

The MAC layer may package data from logical channels into TBs, and may provide the TBs on one or more transport channels to the PHY layer. The PHY layer may handle various operations relating to transmission of a data signal, as described in more detail in connection with FIG. 2. The PHY layer is frequently referred to as Layer 1 (L1). In some aspects, L1 may be a protocol layer on which communication of bits or symbols occurs. In some aspects, L1 may be defined with respect to L2 or a higher layer. For example, L1 may include a first set of services, layers, or sub-layers that occur lower on a protocol stack than a second set of services, layers or sub-layers of L2, L3, and/or like.

On the receiving side (e.g., if a UE is receiving a downlink communication or a BS is receiving an uplink communication), the operations may be similar to those described for the transmitting side, but reversed. For example, the PHY layer may receive TBs, and may provide the TBs on one or more transport channels to the MAC layer. The MAC layer may map the transport channels to logical channels and may provide data to the RLC layer via the logical channels. The RLC layer may map the logical channels to RLC channels and may provide data to the PDCP layer via the RLC channels. The PDCP layer may map the RLC channels to radio bearers and may provide data to the SDAP layer or the RRC/NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU and may pass the PDU to a lower layer. For example, the PDCP layer may encapsulate the PDCP SDU into a PDCP PDU and may pass the PDCP PDU to the RLC layer. The RLC layer may receive the PDCP PDU as an RLC SDU, may encapsulate the RLC SDU into an RLC PDU, and so on. In effect, the PDU carries the SDU as a payload.

As indicated above, FIG. 7 is provided as an example. Other examples may differ from what is described with regard to FIG. 7.

Additional details regarding the protocol stack may be defined with regard to 3GPP Technical Report (TR) 38.801, Release (Rel.) 14, Version (V.) 14.0.0, Section (§) 11, which defines a set of split options for splitting the protocol stack between the CU and one or more DUs. Double split architecture options (e.g., options 2 and 6 or options 2 and 7, as shown in FIG. 7) may be deployed. In some cases, the PHY layer may be at a remote unit (RU) or partially at the RU and partially at the DU. As an example, in a double split architecture with option 2 and 6, a CU may include the RRC and PDCP layers, a DU may include the RLC and MAC layers, and an RU may include a PHY layer. Similarly, in a double split architecture with option 2 and 7, the CU may include the RRC and PDCP layers, the DU may include the RLC, MAC, and High-PHY layers, and the RU may include the Low-PHY layers. As a result of such architectures, cells, which are supported by different DUs and the same CU, may include non-collocated PHY, MAC, and/or RLC layers and collocated PDCP and/or RRC layers.

For transfers between cells of the same CU, a UE may use L3 mobility at the collocated RRC layer. However, L3 mobility may be associated with an excessive delay, processing overhead, or signaling overhead, among other examples. To reduce the delay, processing overhead, or signaling overhead, the UE may use L1 and/or L2 (L1/L2) mobility. L1/L2 mobility may use L1/L2 signaling, which may result in improved performance through lower latency, reduced processing, and/or reduced signaling. Examples of L1/L2 signaling may be found in 3GPP Technical Specification (TS) 38.321 Rel. 16, V. 16.2.1, § 6.1.3 and in 3GPP TS 38.212 Rel. 16, V. 16.3.0, § 7.3. Other examples of L1/L2 signaling may be possible. Other examples of L1/L2 signaling are possible. The improved performance may be applicable to both FR2 operation and FR1 operation. However, some parameters of L1/L2 signaling, such as data paths, control paths, or signaling, among other examples, are not defined for mobility among cells supported by different DUs and the same CU.

Some aspects described herein enable L1/L2 mobility among cells supported by different DUs and the same CU. For example, wireless communication devices, such as UEs, RUs, DUs, or CUs, among other examples, may exchange cell activation or deactivation signaling to achieve mobility within a configured cell set for L1/L2 mobility. In this case, during UE mobility, the wireless communication devices may activate and/or deactivate cells from the configured cell set to enable transfer between cells by the UE. In some aspects, each DU, of a CU, may control respective cells of that DU. Additionally, or alternatively, a first DU may perform cross-DU control on a cell of a second DU. In this way, wireless communication devices, such as UEs, RUs, DUs, or CUs, among other examples, enable L1/L2 mobility among cells supported by different DUs and the same CU.

Figure 8A:
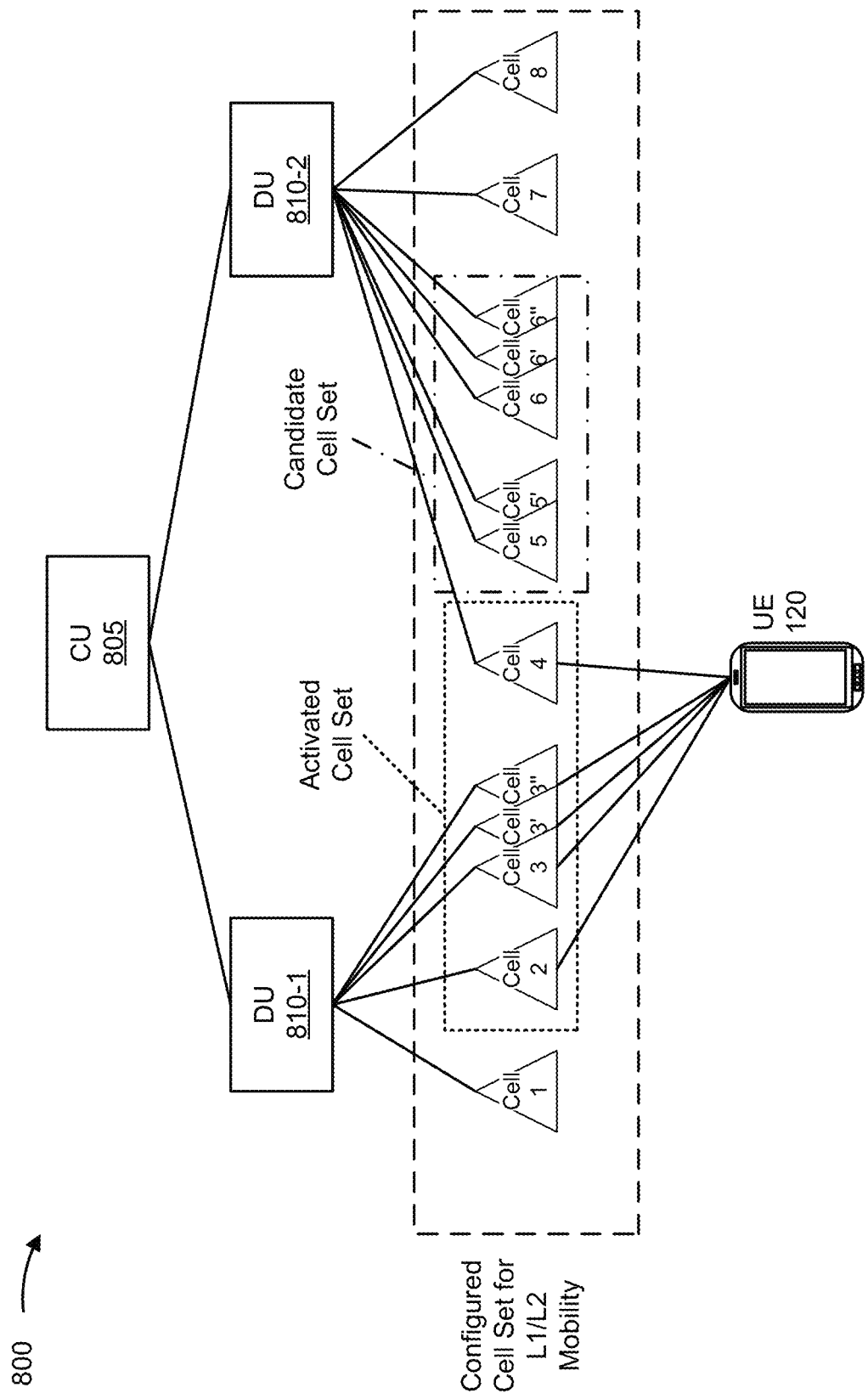
FIGS. 8A-8C are diagrams illustrating examples associated with L1/L2 mobility in multiple DU (multi-DU) deployments, in accordance with various aspects of the present disclosure.
Figure 8B:
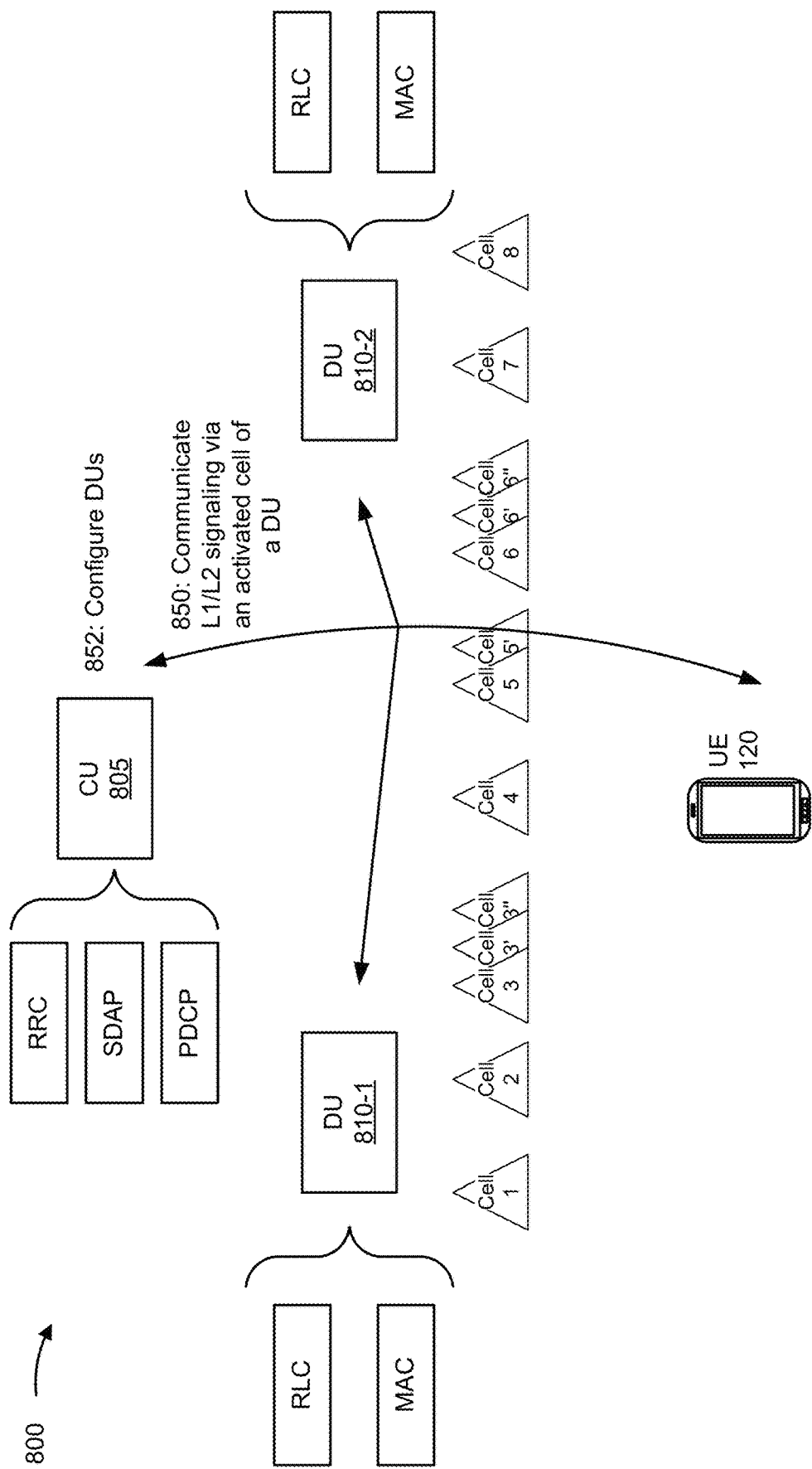
Figure 8C:
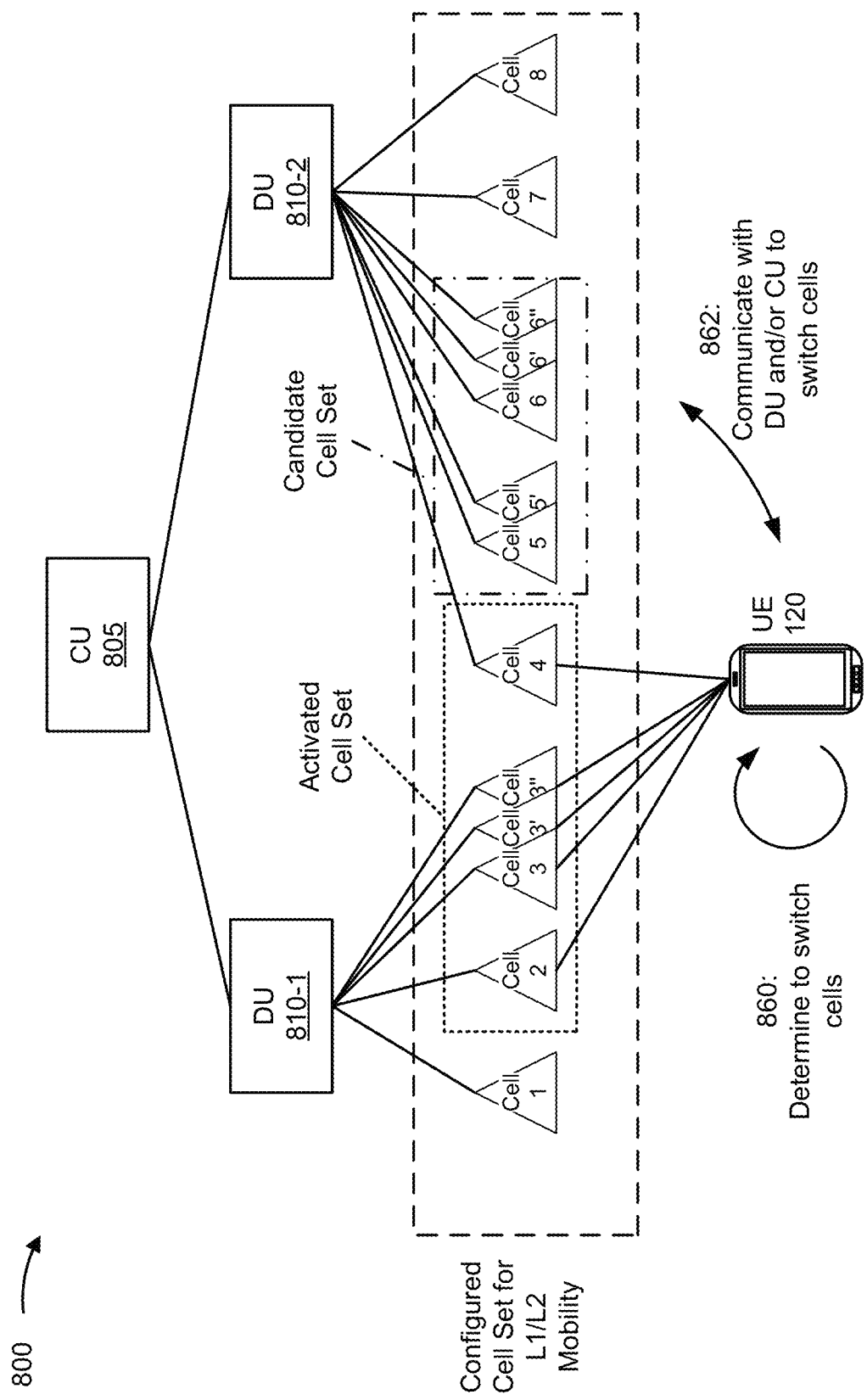

FIGS. 8A-8C are diagrams illustrating an example 800 associated with L1/L2 mobility in multi-DU deployments, in accordance with various aspects of the present disclosure. As shown in FIG. 8A, example 800 includes communication between a CU 805 and a UE 120 via a set of DUs 810 and one or more cells supported by the set of DUs. In some aspects, as described above, the CU 805 and the DUs 810 may correspond to a BS 110 or portions and/or functionalities thereof. In some aspects, the CU 805, the DUs 810, and UE 120 may be included in a wireless network, such as wireless network 100. The CU 805, the DUs 810, and UE 120 may communicate via a wireless access link, which may include an uplink and a downlink.

As further shown in FIG. 8A, in a multi-DU deployment, UE 120 access a first one or more cells (e.g., Cells 1 through 4) provided by a first DU 810-1 of CU 805 or a second one or more cells (e.g., Cells 5 through 8) provided by a second DU 810-2. In this case, each cell may include one or more beams. For example, Cell 3 includes three beams denoted Cell 3, Cell 3', and Cell 3". Similarly, Cell 4 has a single beam denoted Cell 4 and Cell 5 has two beams denoted Cell 5 and Cell 5'. In some aspects, each DU 810 may have one or more RUs (not shown). For example, as described above, a DU may have a set of RUs that each provide one or more of the cells associated with the respective DU. In this case, an RU may provide multi-carrier support and each component carrier may correspond to a cell, as shown. In this case, as described below with regard to activation and deactivation, UE 120 may communicate with an RU, a DU 810, or CU 805 to activate a group of carriers corresponding to activating one or more cells.

In some aspects, UE 120 may receive RRC signaling configuring the set of cells as an L1/L2 configured cell set. The L1/L2 configured cell set may represent a union of each L1/L2 configured cell set of each DU 810. In other words, first DU 810-1 may provide a first L1/L2 configured cell set for UE 120 and second DU 810-2 may provide a second L1/L2 configured cell set for UE 120, and a union of the first L1/L2 configured cell set and the second L1/L2 configured cell set may be termed an 'overall' L1/L2 configured cell set or, depending on the context, 'the L1/L2 configured cell set.'

As further shown in FIG. 8A, within the L1/L2 configured cell set, there may be a subset of cells that form an L1/L2 activated cell set. The L1/L2 activated cell set includes one or more cells in the L1/L2 configured cell set that are activated and managed using L1/L2 signaling. In some aspects, UE 120 may use cells of the L1/L2 activated cell set for control signaling or data communication, among other example. As described above with respect to the L1/L2 configured cell set, each DU 810 may provide a separate L1/L2 activated cell set and the union of all L1/L2 activated cell sets for UE 120 may be termed the 'overall L1/L2 activated cell set' or, depending on the context, 'the L1/L2 activated cell set.'

Cells of the L1/L2 configured cell set, which are not in the L1/L2 activated cell set, may be categorized into an L1/L2 deactivated cell set. The L1/L2 deactivated cell set may include cells that are managed using L1/L2 signaling, but are deactivated for UE 120 (e.g., UE 120 is not to use such a cell for control signaling or data communication, among other examples). As described in more detail below, a deactivated cell may be activated using activation signaling based at least in part on, for example, a mobility of UE 120. Some cells of the L1/L2 deactivated cell set may be included in an L1/L2 candidate cell set. The L1/L2 candidate cell set may include one or more cells that are deactivated, but that can be autonomously activated and added to the L1/L2 activated cell set by UE 120 (e.g., rather than being activated and added to the L1/L2 activated cell set based at least in part on triggering by CU 805 and/or DUs 810).

As shown in FIG. 8B, with regard to a protocol stack in the multi-DU deployment, CU 805 may provide a common RRC entity, PDCP entity, or SDAP entity, among other examples for DUs 810 and UE 120. In contrast, each DU 810 may include a separate MAC entity and RLC entity. For example, DU 810-1 may include a first RLC entity and a first MAC entity and DU 810-2 may include a second MAC RLC entity and a second MAC entity. In some aspects, a quantity of DUs 810 that are configured by CU 805 to serve UE 120 is based at least in part on a UE capability of UE 120. For example, as shown in by reference numbers 850 and 852, CU 805 may communicate with UE 120 (e.g., via an activated cell of a DU 810) to determine a UE capability and may configure DUs 810 for UE 120 based at least in part on the UE capability. In this case, CU 805 may configure a particular quantity of serving DUs 810 for UE 120 based at least in part on a quantity of MAC entities or RLC entities, among other examples, that UE 120 can communicate with in accordance with the UE capability. In other words, when UE 120 is capable of communicating with two MAC entities, CU 805 may configure two DUs 810, which each include a respective MAC entity, as serving DUs for UE 120. In this case, each serving DU may include, for example, a primary cell or a primary secondary cell, among other examples, configured for UE 120. Similarly, CU 805, DUs 810, and/or UE 120 may configure a quantity of configured cells in the L1/L2 configured cell set or a quantity of activated cells in the L1/L2 activated cell set may be based at least in part on the UE capability.

As shown in FIG. 8C, and by reference numbers 860 and 862, UE 120 may determine to switch cells and communicate with a DU 810 or the CU 805 to switch cells. For example, similar to beam management procedures, UE 120 may use L1/L2 signaling to activate or deactivate cells in the L1/L2 configured set and to select one or more beams within an activated cell. In this case, UE 120 uses cell activation signaling to enable mobility operations within the L1/L2 configured set. In some aspects, UE 120 may autonomously activate or deactivate a cell. For example, with regard to cells in the L1/L2 candidate cell set, UE 120 may autonomously determine to activate a cell based at least in part on a channel quality measurement or a loading level, among other examples. In this way, the candidate cell set enables efficient addition of prepared cells for UE 120.

In some aspects, UE 120 may communicate with a DU 810 to activate or deactivate a cell of the DU 810. For example, UE 120 may communicate with DU 810-2 to activate Cell 5 of DU 810-2 and may communicate with DU 810-1 to deactivate Cell 2 of DU 810-1. Additionally, or alternatively, UE 120 may communicate with a DU 810 to activate or deactivate a cell of a another DU 810, which may be termed 'cross-DU control.' For example, UE 120 may communicate with first DU 810-1 to cause DU 810-2 to activate Cell 5. In this case, DU 810-1 may communicate with DU 810-2 (e.g., via a backhaul link and CU 805 or via a direct link between DUs 810, among other examples) to cause DU 810-2 to activate cell 5. In this way, each DU 810 manages, using L1/L2 signaling, its own cells, but another DU 810 may enable coordination between UE 120 and a DU 810 and/or control the DU 810. For example, when a second DU 810-2 has no active cells for UE 120 to use, UE 120 may use communication with first DU 810-1 (e.g., which may be a serving DU) to cause DU 810-2 (e.g., which may be a non-serving DU) to manage its own cells (e.g., an activate a cell for UE 120 to use).

In some aspects, UE 120, a DU 810, or CU 805 may manage a cell activation status (e.g., whether a cell is activated or deactivated or whether to activate or deactivate a cell) based at least in part on a measurement. For example, UE 120 may determine a signal quality measurement (e.g., a reference signal received quality (RSRQ), a signal to noise ratio (SNR), or a signal to noise and interference ratio (SNIR), among other examples) and use L1/L2 signaling to activate or deactivate a cell based at least in part on the signal quality measurement. Additionally, or alternatively, UE 120, a DU 810, or CU 805 may determine a cell activation status based at least in part on a loading parameter (e.g., an amount of UEs 120 using a cell or an amount of data for communication via a cell), a position parameter (e.g., a position of UE 120 or a cell), or a mobility parameter (e.g., a speed or direction at which UE 120 is moving), among other examples.

In some aspects, UE 120 may receive signaling causing UE 120 to perform a measurement. For example, UE 120 may receive L1/L2 signaling indicating that UE 120 is to monitor or measure a subset of beams of one or more cells of the L1/L2 activated set. Additionally, or alternatively, UE 120 may receive signaling indicating that UE 120 is to monitor one or more synchronization signal blocks (SSBs) of one or more cells in the L1/L2 activated set. In this case, based at least in part on UE 120 receiving information to monitor only a subset of SSBs, a measurement complexity is reduced for UE 120. Based at least in part on monitoring or measuring the subset of beams or SSBs, UE 120 may communicate with a DU 810 to enable the DU 810 to manage beams of cells of the DU 810. In some aspects, a DU 810 may control a set of active beams of cells of the DU 810 or a quantity of beams in an active beam set in the cells of the DU 810, among other examples. For example, first DU 810-1 may activate a particular beam of Cell 3 and UE 120 may use the particular beam to receive or transmit control signaling and/or may be scheduled for data communication on the particular beam. In this case, UE 120 may receive signaling scheduling resources for control or data communication from, for example, first DU 810-1. In some aspects, a selection of beams for UE 120 to use is performed by UE 120, a DU 810, or CU 805. For example, UE 120 may provide information identifying a selection. Additionally, or alternatively, UE 120 may provide information identifying a recommendation of a selection and CU 805 or DU 810 may confirm the recommendation of the selection or may select a different beam for UE 120 to use.

As indicated above, FIGS. 8A-8C is provided as an example. Other examples may differ from what is described with respect to FIGS. 8A-8C.

Figure 9:
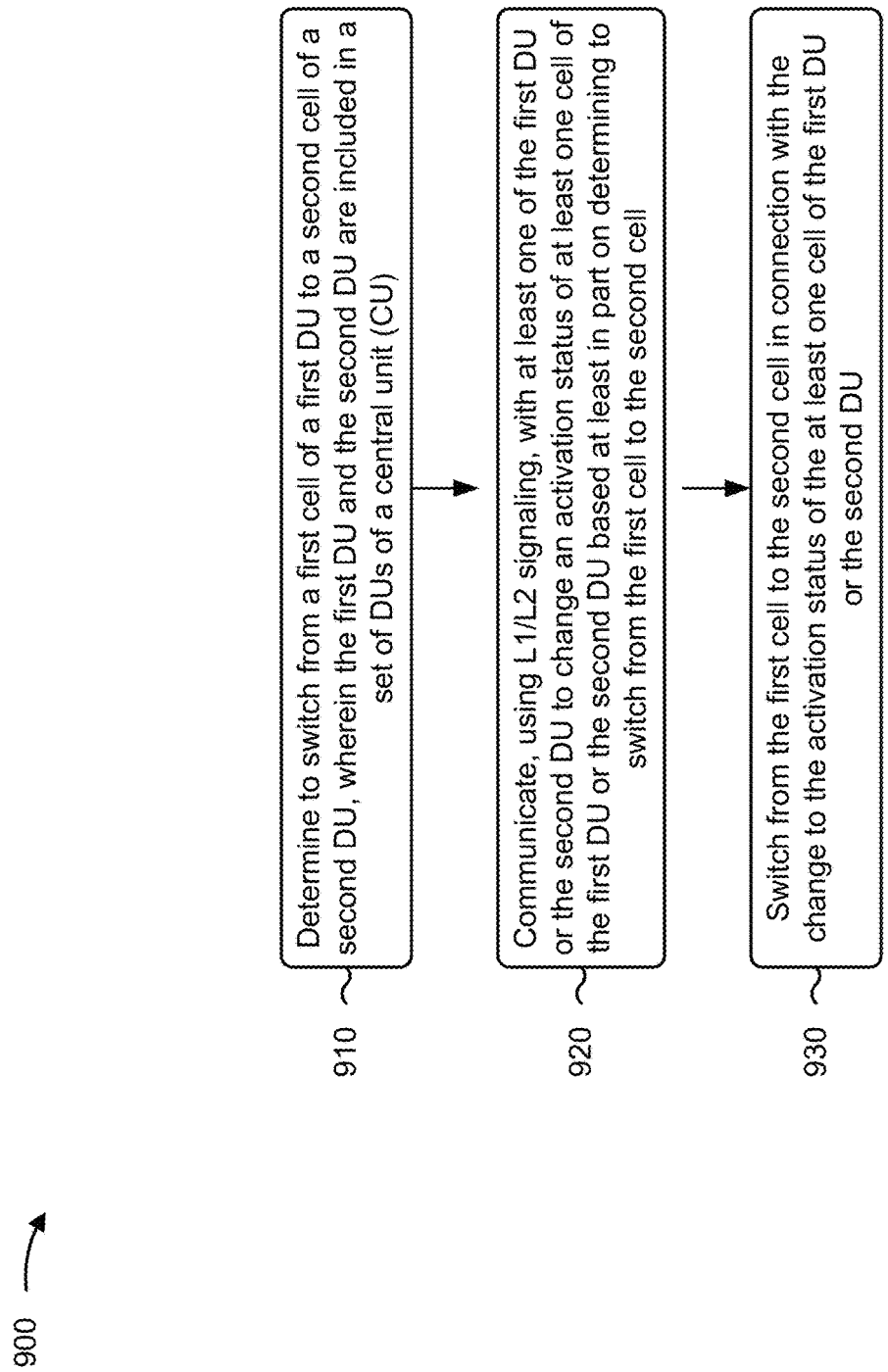
FIGS. 9-10 are diagrams illustrating example processes associated with L1/L2 mobility in multi-DU deployments, in accordance with various aspects of the present disclosure.

FIG. 9 is a diagram illustrating an example process 900 performed, for example, by a user equipment (UE), in accordance with various aspects of the present disclosure. Example process 900 is an example where the UE (e.g., UE 120) performs operations associated with L1/L2 mobility in multi-DU deployments.

As shown in FIG. 9, in some aspects, process 900 may include determining to switch from a first cell of a DU to a second cell of a second DU, wherein the first DU and the second DU are included in a set of DUs of a CU (block 910). For example, the UE (e.g., using determination component 1108, depicted in FIG. 11) may determine to switch from a first cell of a first DU to a second cell of a second DU, wherein the first DU and the second DU are included in a set of DUs of a CU, as described above.

As further shown in FIG. 9, in some aspects, process 900 may include communicating, using L1 or L2 signaling, with at least one of the first DU or the second DU to change an activation status of at least one cell of the first DU or the second DU based at least in part on determining to switch from the first cell to the second cell (block 920). For example, the UE (e.g., using reception component 1102 or transmission component 1104, depicted in FIG. 11) may communicate, using L1 or L2 signaling, with at least one of the first DU or the second DU to change an activation status of at least one cell of the first DU or the second DU based at least in part on determining to switch from the first cell to the second cell, as described above.

As further shown in FIG. 9, in some aspects, process 900 may include switching from the first cell to the second cell in connection with the change to the activation status of the at least one cell of the first DU or the second DU (block 930). For example, the UE (e.g., using switching component 1110, depicted in FIG. 11) may switch from the first cell to the second cell in connection with the change to the activation status of the at least one cell of the first DU or the second DU, as described above.

Process 900 may include additional aspects, such as any single aspect or any combination of aspects described below and/or in connection with one or more other processes described elsewhere herein.

In a first aspect, the at least one cell includes at least one of the first cell, the second cell, or another cell of the CU that is not the first cell or the second cell.

In a second aspect, alone or in combination with the first aspect, the at least one cell is included in a particular cell set, wherein the particular cell set is at least one of a configured cell set, an L1/L2 activated cell set, an L1/L2 deactivated cell set, or an L1/L2 candidate cell set, and wherein communicating to change the activation status of the at least one cell comprises communicating to change the activation status of the at least one cell based at least in part on a type of the particular cell set.

In a third aspect, alone or in combination with one or more of the first and second aspects, the first DU and the second DU have respective medium access control and radio link control entities and common packet data convergence protocol, radio resource control protocol, and service data adaptation protocol entities.

In a fourth aspect, alone or in combination with one or more of the first through third aspects, a quantity of DUs in the set of DUs is based at least in part on a UE capability of the UE.

In a fifth aspect, alone or in combination with one or more of the first through fourth aspects, a quantity of configured or activated cells in a particular cell set of the CU is based at least in part on a UE capability of the UE.

In a sixth aspect, alone or in combination with one or more of the first through fifth aspects, communicating with the at least one of the first DU or the second DU comprises communicating to select a beam of the second cell.

In a seventh aspect, alone or in combination with one or more of the first through sixth aspects, communicating with the at least one of the first DU or the second DU comprises communicating with a first one of the first DU or the second DU to control a parameter of the at least one cell, wherein the at least one cell is associated with a second one of the first DU or the second DU.

In an eighth aspect, alone or in combination with one or more of the first through seventh aspects, each serving DU of the set of DUs includes a respective set of cells, and wherein each respective set of cells includes at least one of a primary cell or a primary secondary cell.

In a ninth aspect, alone or in combination with one or more of the first through eighth aspects, communicating with the at least one of the first DU or the second DU comprises communicating with the at least one of the first DU or the second DU to change the activation status of the at least one cell based at least in part on at least one of a signal quality parameter, a loading parameter, a location parameter, or a mobility direction parameter.

In a tenth aspect, alone or in combination with one or more of the first through ninth aspects, each DU, of the set of DUs, is associated with controlling mobility of a respective set of cells.

In an eleventh aspect, alone or in combination with one or more of the first through tenth aspects, communicating with the at least one of the first DU or the second DU comprises receiving, from one of the first DU or the second DU, cell management signaling regarding a set of cells of the one of the first DU or the second DU.

In a twelfth aspect, alone or in combination with one or more of the first through eleventh aspects, communicating with the at least one of the first DU or the second DU comprises receiving, from a first one of the first DU or the second DU, cell management signaling regarding a set of cells of a second one of the first DU or the second DU.

In a thirteenth aspect, alone or in combination with one or more of the first through twelfth aspects, the second cell is included in an L1/L2 activated cell set.

In a fourteenth aspect, alone or in combination with one or more of the first through thirteenth aspects, the first cell and the second cell are included in an L1/L2 activated cell set, and wherein communicating with the at least one of the first DU or the second DU comprises communicating beam selection information with the at least one of the first DU or the second DU to select from a first beam of the first cell to a second beam of the second cell.

In a fifteenth aspect, alone or in combination with one or more of the first through fourteenth aspects, communicating with the at least one of the first DU or the second DU comprises receiving signaling to monitor or measure one or more beams of one or more cells of an L1/L2 activated cell set.

In a sixteenth aspect, alone or in combination with one or more of the first through fifteenth aspects, communicating with the at least one of the first DU or the second DU comprises receiving signaling to monitor a synchronization signal block of one or more cells of an L1/L2 activated cell set.

In a seventeenth aspect, alone or in combination with one or more of the first through sixteenth aspects, communicating with the at least one of the first DU or the second DU comprises receiving or transmitting control information on one or more beams of one or more cells of an L1/L2 activated cell set.

In an eighteenth aspect, alone or in combination with one or more of the first through seventeenth aspects, communicating with the at least one of the first DU or the second DU comprises receiving scheduling information to schedule a data communication on one or more beams of one or more cells of an L1/L2 activated cell set.

In a nineteenth aspect, alone or in combination with one or more of the first through eighteenth aspects, communicating with the at least one of the first DU or the second DU comprises communicating beam selection information identifying a selection of one or more beams of one or more cells of an L1/L2 activated cell set, wherein the selection is based at least in part on a UE recommendation, a UE decision, or a network decision.

In a twentieth aspect, alone or in combination with one or more of the first through nineteenth aspects, process 900 includes selecting a particular cell of an L1/L2 candidate cell set, and autonomously adding the particular cell to an L1/L2 activated cell set.

In a twenty-first aspect, alone or in combination with one or more of the first through twentieth aspects, selecting the particular cell comprises selecting the particular cell based at least in part on a channel quality or a channel load.

In a twenty-second aspect, alone or in combination with one or more of the first through twenty-first aspects, communicating with the at least one of the first DU or the second DU comprises receiving, on a non-serving cell DU, L1/L2 signaling identifying the change to the activation status of the at least one cell based at least in part on a cross-DU selection of the at least one cell.

In a twenty-third aspect, alone or in combination with one or more of the first through twenty-second aspects, each DU is associated with a respective one or more remote units (RUs), and wherein each of the respective one or more RUs supports one or more component carriers corresponding to one or more cells of a set of cells of the set of DUs.

In a twenty-fourth aspect, alone or in combination with one or more of the first through twenty-third aspects, communicating with the at least one of the first DU or the second DU comprises communicating to change an activation status of a group of carriers, wherein the group of carriers includes at least one component carrier corresponding to the at least one cell.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
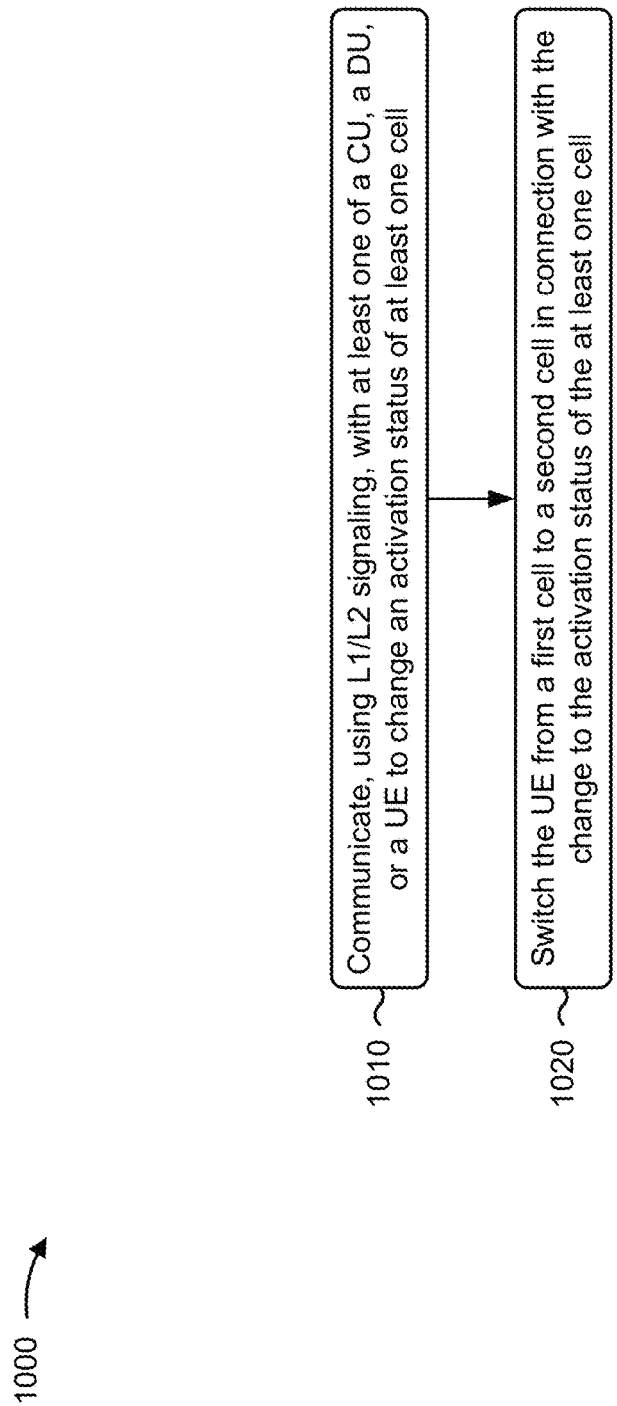

FIG. 10 is a diagram illustrating an example process 1000 performed, for example, by a wireless communication device, in accordance with various aspects of the present disclosure. Example process 1000 is an example where the wireless communication device (e.g., UE 120, DU 810-1, DU 810-2, or CU 805, among other examples) performs operations associated with L1/L2 mobility in multi-DU deployments.

As shown in FIG. 10, in some aspects, process 1000 may include communicating, using L1/L2 signaling, with at least one of a CU, a DU, or a UE, to change an activation status of at least one cell (block 1010). For example, the wireless communication device (e.g., using reception component 1202 or transmission component 1204, depicted in FIG. 12) may communicate, using L1/L2 signaling, with at least one of a CU, a DU, or a UE, to change an activation status of at least one cell, as described above.

As further shown in FIG. 10, in some aspects, process 1000 may include switching the UE from a first cell to a second cell in connection with the change to the activation status of the at least one cell (block 1020). For example, the wireless communication device (e.g., using switching component 1210, depicted in FIG. 12) may switch the UE from a first cell to a second cell in connection with the change to the activation status of the at least one cell, as described above.

Process 1000 may include additional aspects, such as any single aspect or any combination of aspects described below and/or in connection with one or more other processes described elsewhere herein.

In a first aspect, the wireless communication device is one of the CU, the DU, another DU, or the UE.

In a second aspect, alone or in combination with the first aspect, process 1000 includes communicating, using further L1/L2 signaling, to select a beam for the UE.

In a third aspect, alone or in combination with one or more of the first and second aspects, the at least one cell includes at least one of the first cell, the second cell, or another cell of the CU that is not the first cell or the second cell.

In a fourth aspect, alone or in combination with one or more of the first through third aspects, the at least one cell is included in a particular cell set, wherein the particular cell set is at least one of a configured cell set, an L1/L2 activated cell set, an L1/L2 deactivated cell set, or an L1/L2 candidate cell set, and wherein communicating to change the activation status of the at least one cell comprises communicating to change the activation status of the at least one cell based at least in part on a type of the particular cell set.

In a fifth aspect, alone or in combination with one or more of the first through fourth aspects, each DU of the CU has respective medium access control and radio link control entities and common packet data convergence protocol, radio resource control protocol, and service data adaptation protocol entities.

In a sixth aspect, alone or in combination with one or more of the first through fifth aspects, a quantity of DUs in a set of DUs of the CU is based at least in part on a UE capability of the UE.

In a seventh aspect, alone or in combination with one or more of the first through sixth aspects, a quantity of configured or activated cells in a particular cell set of the CU is based at least in part on a UE capability of the UE.

In an eighth aspect, alone or in combination with one or more of the first through seventh aspects, communicating to change the activation status of the at least one cell comprises communicating to select a beam of the second cell.

In a ninth aspect, alone or in combination with one or more of the first through eighth aspects, communicating to change the activation status of the at least one cell comprises communicating with a first DU of the CU to control a parameter of the at least one cell, wherein the at least one cell is associated with a DU of the CU.

In a tenth aspect, alone or in combination with one or more of the first through ninth aspects, each serving DU of the CU includes a respective set of cells, and wherein each respective set of cells includes at least one of a primary cell or a primary secondary cell.

In an eleventh aspect, alone or in combination with one or more of the first through tenth aspects, communicating to change the activation status of the at least one cell comprises communicating to change the activation status of the at least one cell based at least in part on at least one of a signal quality parameter, a loading parameter, a location parameter, or a mobility direction parameter.

In a twelfth aspect, alone or in combination with one or more of the first through eleventh aspects, each DU, of the set of DUs, is associated with controlling mobility of a respective set of cells.

In a thirteenth aspect, alone or in combination with one or more of the first through twelfth aspects, communicating to change the activation status of the at least one cell comprises receiving, from a particular DU of the CU, cell management signaling regarding a set of cells of the particular DU.

In a fourteenth aspect, alone or in combination with one or more of the first through thirteenth aspects, communicating to change the activation status of the at least one cell comprises receiving, from a first DU of the CU, cell management signaling regarding a set of cells of a second DU of the CU.

In a fifteenth aspect, alone or in combination with one or more of the first through fourteenth aspects, the second cell is included in an L1/L2 activated cell set.

In a sixteenth aspect, alone or in combination with one or more of the first through fifteenth aspects, the first cell and the second cell are included in an L1/L2 activated cell set, and wherein communicating to change the activation status of the at least one cell comprises communicating beam selection information to select from a first beam of the first cell to a second beam of the second cell.

In a seventeenth aspect, alone or in combination with one or more of the first through sixteenth aspects, communicating to change the activation status of the at least one cell comprises communicating signaling associated with control of monitoring or measurement of one or more beams of one or more cells of an L1/L2 activated cell set.

In an eighteenth aspect, alone or in combination with one or more of the first through seventeenth aspects, communicating to change the activation status of the at least one cell comprises communicating signaling to control monitoring of a synchronization signal block of one or more cells of an L1/L2 activated cell set.

In a nineteenth aspect, alone or in combination with one or more of the first through eighteenth aspects, communicating to change the activation status of the at least one cell comprises communicating control information on one or more beams of one or more cells of an L1/L2 activated cell set.

In a twentieth aspect, alone or in combination with one or more of the first through nineteenth aspects, communicating to change the activation status of the at least one cell comprises communicating scheduling information to schedule a data communication of the UE on one or more beams of one or more cells of an L1/L2 activated cell set.

In a twenty-first aspect, alone or in combination with one or more of the first through twentieth aspects, communicating to change the activation status of the at least one cell comprises communicating beam selection information identifying a selection of one or more beams of one or more cells of an L1/L2 activated cell set, wherein the selection is based at least in part on a UE recommendation, a UE decision, or a network decision.

In a twenty-second aspect, alone or in combination with one or more of the first through twenty-first aspects, process 1000 includes communicating with a UE to process an autonomous add of a particular cell to an L1/L2 activated cell set.

In a twenty-third aspect, alone or in combination with one or more of the first through twenty-second aspects, the particular cell is selected based at least in part on a channel quality or a channel load.

In a twenty-fourth aspect, alone or in combination with one or more of the first through twenty-third aspects, communicating to change the activation status of the at least one cell comprises communicating, on a non-serving cell DU, L1/L2 signaling identifying the change to the activation status of the at least one cell based at least in part on a cross-DU selection of the at least one cell.

In a twenty-fifth aspect, alone or in combination with one or more of the first through twenty-fourth aspects, each DU of a CU is associated with a respective one or more remote units (RUs), and wherein each of the respective one or more RUs supports one or more component carriers corresponding to one or more cells of a set of cells of the set of DUs.

In a twenty-sixth aspect, alone or in combination with one or more of the first through twenty-fifth aspects, communicating to change the activation status of the at least one cell comprises communicating to change an activation status of a group of carriers, wherein the group of carriers includes at least one component carrier corresponding to the at least one cell.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
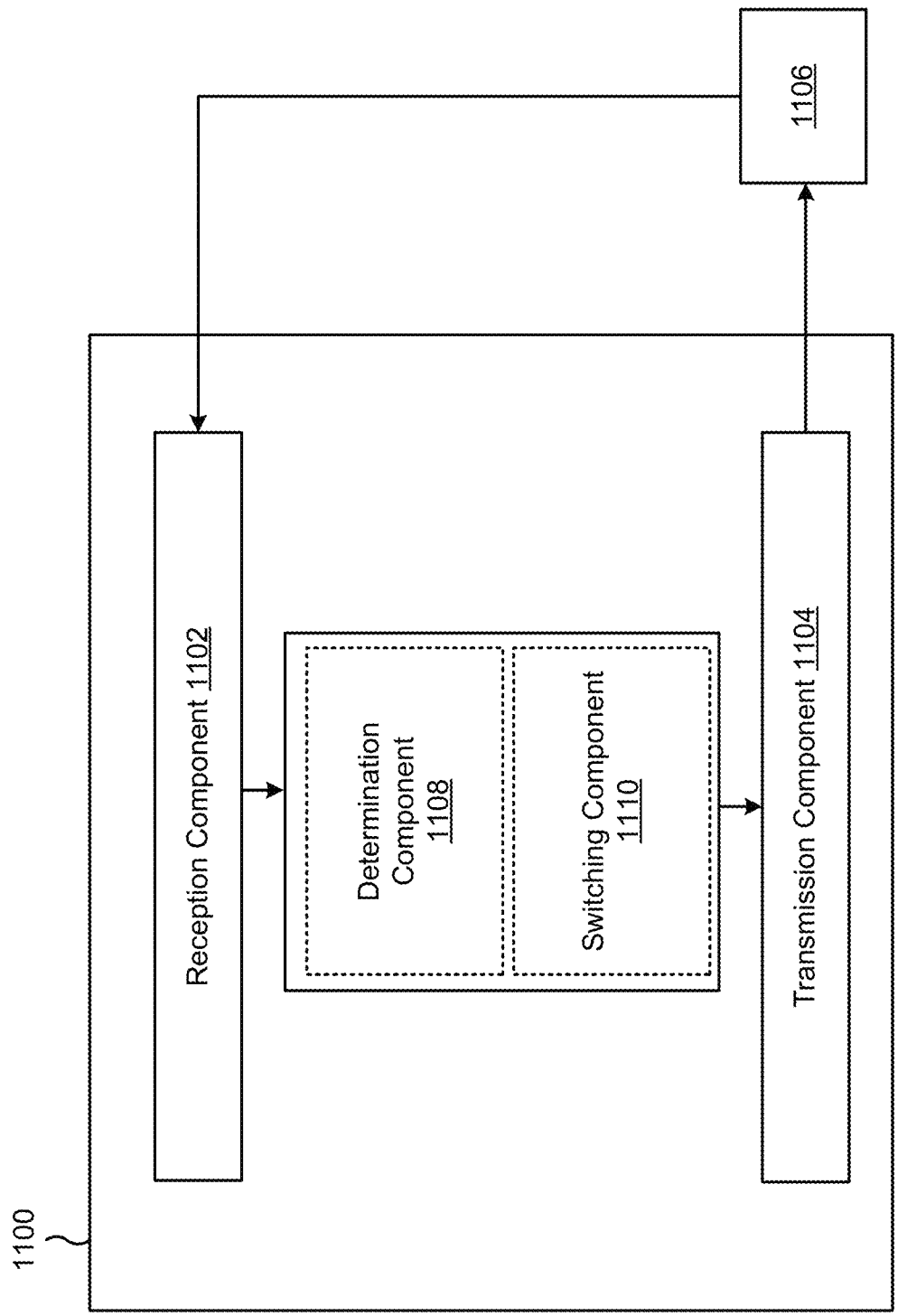
FIGS. 11-12 are block diagrams of example apparatuses for wireless communication, in accordance with various aspects of the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a determination component 1108 or a switching component 1110, among other examples.

In some aspects, the apparatus 1100 may be configured to perform one or more operations described herein in connection with FIGS. 8A-8C. Additionally, or alternatively, the apparatus 1100 may be configured to perform one or more processes described herein, such as process 900 of FIG. 9, among other examples. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The determination component 1108 may determine to switch from a first cell of a first DU to a second cell of a second DU, wherein the first DU and the second DU are included in a set of DUs of a CU. The reception component 1102 or the transmission component 1104 may communicate, using L1/L2 signaling, with at least one of the first DU or the second DU to change an activation status of at least one cell of the first DU or the second DU based at least in part on determining to switch from the first cell to the second cell. The switching component 1110 may switch from the first cell to the second cell in connection with the change to the activation status of the at least one cell of the first DU or the second DU. The determination component 1108 may select a particular cell of an L1/L2 candidate cell set. The switching component 1110 may autonomously add the particular cell to an L1/L2 activated cell set.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
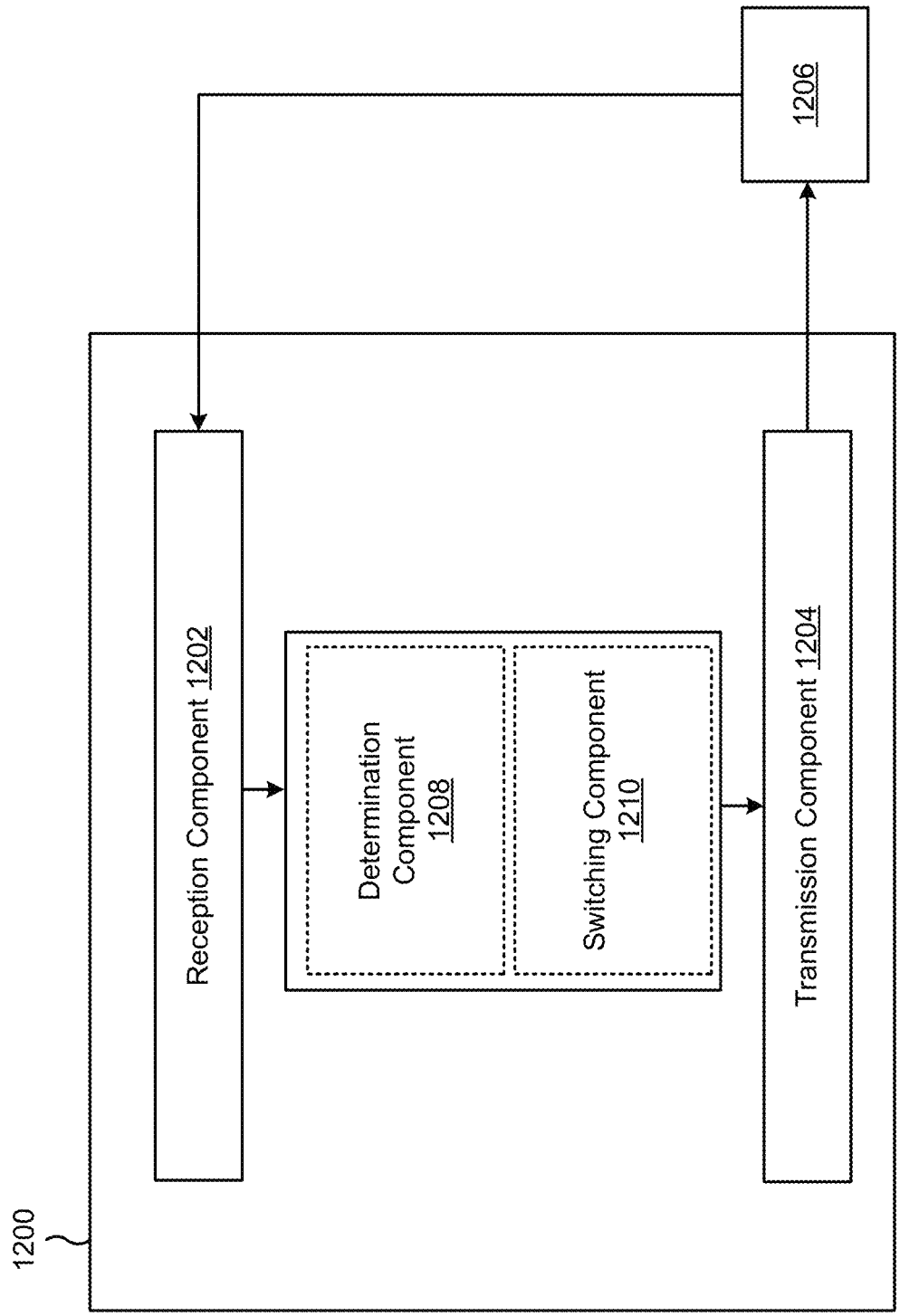

FIG. 12 is a block diagram of an example apparatus 1200 for wireless communication. The apparatus 1200 may be a wireless communication device, such as a UE, a CU, or a DU, among other examples, or the wireless communication device may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, a DU, a CU, or another wireless communication device) using the reception component 1202 and the transmission component 1204. As further shown, the apparatus 1200 may include one or more of a determination component 1208 or a switching component 1210, among other examples.

In some aspects, the apparatus 1200 may be configured to perform one or more operations described herein in connection with FIGS. 8A-8C. Additionally, or alternatively, the apparatus 1200 may be configured to perform one or more processes described herein, such as process 1000 of FIG. 10, among other examples. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE or BS described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

The reception component 1202 or the transmission component 1204 may communicate, using L1/L2 signaling, with at least one of a CU, a DU, or a UE, to change an activation status of at least one cell. The switching component 1210 may switch the UE from a first cell to a second cell in connection with the change to the activation status of the at least one cell. The reception component 1202 or the transmission component 1204 may communicate, using further L1/L2 signaling, to select a beam for the UE. The reception component 1202 or the transmission component 1204 may communicate with a UE to process an autonomous add of a particular cell to an L1/L2 activated cell set. The determination component 1208 may enable selection of a cell or beam to activate or deactivate.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of aspects of the present disclosure:

Aspect 1: A method of wireless communication performed by a user equipment (UE), comprising: determining to switch from a first cell of a first distributed unit (DU) to a second cell of a second DU, wherein the first DU and the second DU are included in a set of DUs of a central unit (CU); communicating, using layer 1 (L1) or layer 2 (L2) signaling, with at least one of the first DU or the second DU to change an activation status of at least one cell of the first DU or the second DU based at least in part on determining to switch from the first cell to the second cell; and switching from the first cell to the second cell in connection with the change to the activation status of the at least one cell of the first DU or the second DU.

Aspect 2: The method of claim 1, wherein the at least one cell includes at least one of: the first cell, the second cell, or another cell of the CU that is not the first cell or the second cell.

Aspect 3: The method of any of claims 1 to 2, wherein the at least one cell is included in a particular cell set, wherein the particular cell set is at least one of: a configured cell set, an L1/L2 activated cell set, an L1/L2 deactivated cell set, or an L1/L2 candidate cell set, and wherein communicating to change the activation status of the at least one cell comprises: communicating to change the activation status of the at least one cell based at least in part on a type of the particular cell set.

Aspect 4: The method of any of claims 1 to 3, wherein the first DU and the second DU have respective medium access control and radio link control entities and common packet data convergence protocol, radio resource control protocol, and service data adaptation protocol entities.

Aspect 5: The method of any of claims 1 to 4, wherein a quantity of DUs in the set of DUs is based at least in part on a UE capability of the UE.

Aspect 6: The method of any of claims 1 to 5, wherein a quantity of configured or activated cells in a particular cell set of the CU is based at least in part on a UE capability of the UE.

Aspect 7: The method of any of claims 1 to 6, wherein communicating with the at least one of the first DU or the second DU comprises: communicating to select a beam of the second cell.

Aspect 8: The method of any of claims 1 to 7, wherein communicating with the at least one of the first DU or the second DU comprises: communicating with a first one of the first DU or the second DU to control a parameter of the at least one cell, wherein the at least one cell is associated with a second one of the first DU or the second DU.

Aspect 9: The method of any of claims 1 to 8, wherein each serving DU of the set of DUs includes a respective set of cells, and wherein each respective set of cells includes at least one of a primary cell or a primary secondary cell.

Aspect 10: The method of any of claims 1 to 9, wherein communicating with the at least one of the first DU or the second DU comprises: communicating with the at least one of the first DU or the second DU to change the activation status of the at least one cell based at least in part on at least one of: a signal quality parameter, a loading parameter, a location parameter, or a mobility direction parameter.

Aspect 11: The method of any of claims 1 to 10, wherein each DU, of the set of DUs, is associated with controlling mobility of a respective set of cells.

Aspect 12: The method of claim 11, wherein communicating with the at least one of the first DU or the second DU comprises: receiving, from one of the first DU or the second DU, cell management signaling regarding a set of cells of the one of the first DU or the second DU.

Aspect 13: The method of any of claims 11 to 12, wherein communicating with the at least one of the first DU or the second DU comprises: receiving, from a first one of the first DU or the second DU, cell management signaling regarding a set of cells of a second one of the first DU or the second DU.

Aspect 14: The method of any of claims 1 to 13, wherein the second cell is included in an L1/L2 activated cell set.

Aspect 15: The method of any of claims 1 to 14, wherein the first cell and the second cell are included in an L1/L2 activated cell set, and wherein communicating with the at least one of the first DU or the second DU comprises: communicating beam selection information with the at least one of the first DU or the second DU to select from a first beam of the first cell to a second beam of the second cell.

Aspect 16: The method of any of claims 1 to 15, wherein communicating with the at least one of the first DU or the second DU comprises: receiving signaling to monitor or measure one or more beams of one or more cells of an L1/L2 activated cell set.

Aspect 17: The method of any of claims 1 to 16, wherein communicating with the at least one of the first DU or the second DU comprises: receiving signaling to monitor a synchronization signal block of one or more cells of an L1/L2 activated cell set.

Aspect 18: The method of any of claims 1 to 17, wherein communicating with the at least one of the first DU or the second DU comprises: receiving or transmitting control information on one or more beams of one or more cells of an L1/L2 activated cell set.

Aspect 19: The method of any of claims 1 to 18, wherein communicating with the at least one of the first DU or the second DU comprises: receiving scheduling information to schedule a data communication on one or more beams of one or more cells of an L1/L2 activated cell set.

Aspect 20: The method of any of claims 1 to 19, wherein communicating with the at least one of the first DU or the second DU comprises: communicating beam selection information identifying a selection of one or more beams of one or more cells of an L1/L2 activated cell set, wherein the selection is based at least in part on a UE recommendation, a UE decision, or a network decision.

Aspect 21: The method of any of claims 1 to 20, further comprising: selecting a particular cell of an L1/L2 candidate cell set, and autonomously adding the particular cell to an L1/L2 activated cell set.

Aspect 22: The method of claim 21, wherein selecting the particular cell comprises: selecting the particular cell based at least in part on a channel quality or a channel load.

Aspect 23: The method of any of claims 1 to 22, wherein communicating with the at least one of the first DU or the second DU comprises: receiving, on a non-serving cell DU, L1/L2 signaling identifying the change to the activation status of the at least one cell based at least in part on a cross-DU selection of the at least one cell.

Aspect 24: The method of any of claims 1 to 23, wherein each DU is associated with a respective one or more remote units (RUs), and wherein each of the respective one or more RUs supports one or more component carriers corresponding to one or more cells of a set of cells of the set of DUs.

Aspect 25: The method of claim 24, wherein communicating with the at least one of the first DU or the second DU comprises: communicating to change an activation status of a group of carriers, wherein the group of carriers includes at least one component carrier corresponding to the at least one cell.

Aspect 26: A method of wireless communication performed by a wireless communication device, comprising: communicating, using layer 1 (L1) or layer 2 (L2) signaling, with at least one of a central unit (CU), a distributed unit (DU), or a user equipment (UE), to change an activation status of at least one cell; and switching the UE from a first cell to a second cell in connection with the change to the activation status of the at least one cell.

Aspect 27: The method of claim 26, wherein the wireless communication device is one of the CU, the DU, another DU, or the UE.

Aspect 28: The method of any of claims 26 to 27, further comprising: communicating, using further L1/L2 signaling, to select a beam for the UE.

Aspect 29: The method of any of claims 26 to 28, wherein the at least one cell includes at least one of: the first cell, the second cell, or another cell of the CU that is not the first cell or the second cell.

Aspect 30: The method of any of claims 26 to 29, wherein the at least one cell is included in a particular cell set, wherein the particular cell set is at least one of: a configured cell set, an L1/L2 activated cell set, an L1/L2 deactivated cell set, or an L1/L2 candidate cell set, and wherein communicating to change the activation status of the at least one cell comprises: communicating to change the activation status of the at least one cell based at least in part on a type of the particular cell set.

Aspect 31: The method of any of claims 26 to 30, wherein each DU of the CU has respective medium access control and radio link control entities and common packet data convergence protocol, radio resource control protocol, and service data adaptation protocol entities.

Aspect 32: The method of any of claims 26 to 31, wherein a quantity of DUs in a set of DUs of the CU is based at least in part on a UE capability of the UE.

Aspect 33: The method of any of claims 26 to 32, wherein a quantity of configured or activated cells in a particular cell set of the CU is based at least in part on a UE capability of the UE.

Aspect 34: The method of any of claims 26 to 33, wherein communicating to change the activation status of the at least one cell comprises: communicating to select a beam of the second cell.

Aspect 35: The method of any of claims 26 to 34, wherein communicating to change the activation status of the at least one cell comprises: communicating with a first DU of the CU to control a parameter of the at least one cell, wherein the at least one cell is associated with a DU of the CU.

Aspect 36: The method of any of claims 26 to 35, wherein each serving DU of the CU includes a respective set of cells, and wherein each respective set of cells includes at least one of a primary cell or a primary secondary cell.

Aspect 37: The method of any of claims 26 to 36, wherein communicating to change the activation status of the at least one cell comprises: communicating to change the activation status of the at least one cell based at least in part on at least one of: a signal quality parameter, a loading parameter, a location parameter, or a mobility direction parameter.

Aspect 38: The method of any of claims 26 to 37, wherein each DU, of the set of DUs, is associated with controlling mobility of a respective set of cells.

Aspect 39: The method of claim 38, wherein communicating to change the activation status of the at least one cell comprises: receiving, from a particular DU of the CU, cell management signaling regarding a set of cells of the particular DU.

Aspect 40: The method of any of claims 38 to 40, wherein communicating to change the activation status of the at least one cell comprises: receiving, from a first DU of the CU, cell management signaling regarding a set of cells of a second DU of the CU.

Aspect 41: The method of any of claims 26 to 40, wherein the second cell is included in an L1/L2 activated cell set.

Aspect 42: The method of any of claims 26 to 41, wherein the first cell and the second cell are included in an L1/L2 activated cell set, and wherein communicating to change the activation status of the at least one cell comprises: communicating beam selection information to select from a first beam of the first cell to a second beam of the second cell.

Aspect 43: The method of any of claims 26 to 42, wherein communicating to change the activation status of the at least one cell comprises: communicating signaling associated with control of monitoring or measurement of one or more beams of one or more cells of an L1/L2 activated cell set.

Aspect 44: The method of any of claims 26 to 43, wherein communicating to change the activation status of the at least one cell comprises: communicating signaling to control monitoring of a synchronization signal block of one or more cells of an L1/L2 activated cell set.

Aspect 45: The method of any of claims 26 to 44, wherein communicating to change the activation status of the at least one cell comprises: communicating control information on one or more beams of one or more cells of an L1/L2 activated cell set.

Aspect 46: The method of any of claims 26 to 45, wherein communicating to change the activation status of the at least one cell comprises: communicating scheduling information to schedule a data communication of the UE on one or more beams of one or more cells of an L1/L2 activated cell set.

Aspect 47: The method of any of claims 26 to 46, wherein communicating to change the activation status of the at least one cell comprises: communicating beam selection information identifying a selection of one or more beams of one or more cells of an L1/L2 activated cell set, wherein the selection is based at least in part on a UE recommendation, a UE decision, or a network decision.

Aspect 48: The method of any of claims 26 to 47, further comprising: communicating with a UE to process an autonomous add of a particular cell to an L1/L2 activated cell set.

Aspect 49: The method of claim 48, wherein the particular cell is selected based at least in part on a channel quality or a channel load.

Aspect 50: The method of any of claims 26 to 49, wherein communicating to change the activation status of the at least one cell comprises: communicating, on a non-serving cell DU, L1/L2 signaling identifying the change to the activation status of the at least one cell based at least in part on a cross-DU selection of the at least one cell.

Aspect 51: The method of any of claims 26 to 50, wherein each DU of a CU is associated with a respective one or more remote units (RUs), and wherein each of the respective one or more RUs supports one or more component carriers corresponding to one or more cells of a set of cells of the set of DUs.

Aspect 52: The method of claim 51, wherein communicating to change the activation status of the at least one cell comprises: communicating to change an activation status of a group of carriers, wherein the group of carriers includes at least one component carrier corresponding to the at least one cell.

Aspect 53: An apparatus for wireless communication at a first device, comprising a processor; memory coupled with the processor; and instructions stored in the memory and executable by the processor to cause the apparatus to perform a method of any of aspects 1-25.

Aspect 54: A UE for wireless communication, comprising a memory and one or more processors coupled to the memory, the memory and the one or more processors configured to perform a method of any of aspects 1-25.

Aspect 55: An apparatus for wireless communication, comprising at least one means for performing a method of any of aspects 1-25.

Aspect 56: A non-transitory computer-readable medium storing code for wireless communication, the code comprising instructions executable by a processor to perform a method of any of aspects 1-25.

Aspect 57: A non-transitory computer-readable medium storing one or more instructions for wireless communication, the one or more instructions comprising one or more instructions that, when executed by one or more processors of a UE, cause the one or more processors to perform a method of any of aspects 1-25.

Aspect 58: An apparatus for wireless communication at a first device, comprising a processor; memory coupled with the processor; and instructions stored in the memory and executable by the processor to cause the apparatus to perform a method of any of aspects 26-52.

Aspect 59: A wireless communication device for wireless communication, comprising a memory and one or more processors coupled to the memory, the memory and the one or more processors configured to perform a method of any of aspects 26-52.

Aspect 60: An apparatus for wireless communication, comprising at least one means for performing a method of any of aspects 26-52.

Aspect 61: A non-transitory computer-readable medium storing code for wireless communication, the code comprising instructions executable by a processor to perform a method of any of aspects 26-52.

Aspect 62: A non-transitory computer-readable medium storing one or more instructions for wireless communication, the one or more instructions comprising one or more instructions that, when executed by one or more processors of a wireless communication device, cause the one or more processors to perform a method of any of aspects 26-52.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    determining to switch from a first cell of a first distributed unit (DU) to a second cell of a second DU, wherein the first DU and the second DU are included in a set of DUs of a central unit (CU), and wherein the first DU and the second DU have respective medium access control and radio link control entities and common packet data convergence protocol, radio resource control protocol, and service data adaptation protocol entities;
    communicating, using layer 1 (L1) or layer 2 (L2) signaling, with at least one of the first DU or the second DU to change an activation status of at least one cell of the first DU or the second DU based at least in part on determining to switch from the first cell to the second cell, wherein the at least one cell is included in an L1/L2 activated cell set of the first DU or the second DU or an L1/L2 deactivated cell set of the first DU or the second DU; and
    switching from the first cell to the second cell in connection with the change to the activation status of the at least one cell of the first DU or the second DU.

2. The method of claim 1, wherein the at least one cell includes at least one of: the first cell, the second cell, or another cell of the CU that is not the first cell or the second cell.

3. The method of claim 1, wherein the at least one cell is included in a particular cell set, wherein the particular cell set is at least one of: the L1/L2 activated cell set of the first DU or the second DU, the L1/L2 deactivated cell set of the first DU or the second DU, or an L1/L2 candidate cell set, wherein the L1/L2 candidate cell set is a subset of cells of the L1/L2 deactivated cell set of the first DU or the second DU, and
    wherein communicating to change the activation status of the at least one cell comprises:

communicating to change the activation status of the at least one cell based at least in part on a type of the particular cell set.

4. The method of claim 1, wherein a quantity of DUs in the set of DUs is based at least in part on a UE capability of the UE.

5. The method of claim 4, wherein the UE capability comprises a quantity of medium access control entities or radio link control entities that the UE is capable of communicating with.

6. The method of claim 1, wherein a quantity of configured or activated cells in a particular cell set of the CU is based at least in part on a UE capability of the UE.

7. The method of claim 1, wherein communicating with the at least one of the first DU or the second DU comprises: communicating to select a beam of the second cell.

8. The method of claim 1, wherein communicating with the at least one of the first DU or the second DU comprises: communicating with a first one of the first DU or the second DU to control a parameter of the at least one cell, wherein the at least one cell is associated with a second one of the first DU or the second DU.

9. The method of claim 1, wherein each serving DU of the set of DUs includes a respective set of cells, and wherein each respective set of cells includes at least one of a primary cell or a primary secondary cell.

10. The method of claim 1, wherein communicating with the at least one of the first DU or the second DU comprises: communicating with the at least one of the first DU or the second DU to change the activation status of the at least one cell based at least in part on at least one of:
   a signal quality parameter,
   a loading parameter,
   a location parameter, or
   a mobility direction parameter.

11. The method of claim 1, wherein each DU, of the set of DUs, is associated with controlling mobility of a respective set of cells.

12. The method of claim 11, wherein communicating with the at least one of the first DU or the second DU comprises: receiving, from one of the first DU or the second DU, cell management signaling regarding a set of cells of the one of the first DU or the second DU.

13. The method of claim 11, wherein communicating with the at least one of the first DU or the second DU comprises: receiving, from a first one of the first DU or the second DU, cell management signaling regarding a set of cells of a second one of the first DU or the second DU.

14. The method of claim 1, wherein the second cell is included in an L1/L2 activated cell set.

15. The method of claim 1, wherein the first cell and the second cell are included in an L1/L2 activated cell set, and wherein communicating with the at least one of the first DU or the second DU comprises:
   communicating beam selection information with the at least one of the first DU or the second DU to select from a first beam of the first cell to a second beam of the second cell.

16. The method of claim 1, wherein communicating with the at least one of the first DU or the second DU comprises: receiving signaling to monitor or measure one or more beams of one or more cells of an L1/L2 activated cell set.

17. The method of claim 1, wherein communicating with the at least one of the first DU or the second DU comprises: receiving signaling to monitor a synchronization signal block of one or more cells of an L1/L2 activated cell set.

18. The method of claim 1, wherein communicating with the at least one of the first DU or the second DU comprises: receiving or transmitting control information on one or more beams of one or more cells of an L1/L2 activated cell set.

19. The method of claim 1, wherein communicating with the at least one of the first DU or the second DU comprises: receiving scheduling information to schedule a data communication on one or more beams of one or more cells of an L1/L2 activated cell set.

20. The method of claim 1, wherein communicating with the at least one of the first DU or the second DU comprises: communicating beam selection information identifying a selection of one or more beams of one or more cells of an L1/L2 activated cell set,
   wherein the selection is based at least in part on a UE recommendation, a UE decision, or a network decision.

21. The method of claim 1, further comprising:
   selecting a particular cell of an L1/L2 candidate cell set, and
   autonomously adding the particular cell to an L1/L2 activated cell set.

22. The method of claim 21, wherein selecting the particular cell comprises:
   selecting the particular cell based at least in part on a channel quality or a channel load.

23. The method of claim 1, wherein communicating with the at least one of the first DU or the second DU comprises: receiving, on a non-serving cell DU, L1/L2 signaling identifying the change to the activation status of the at least one cell based at least in part on a cross-DU selection of the at least one cell.

24. The method of claim 1, wherein each DU is associated with a respective one or more remote units (RUs), and wherein each of the respective one or more RUs supports one or more component carriers corresponding to one or more cells of a set of cells of the set of DUs.

25. The method of claim 24, wherein communicating with the at least one of the first DU or the second DU comprises: communicating to change an activation status of a group of carriers, wherein the group of carriers includes at least one component carrier corresponding to the at least one cell.

26. A method of wireless communication performed by a wireless communication device, comprising:
   communicating, using layer 1 (L1) or layer 2 (L2) signaling, with at least one of a central unit (CU), a distributed unit (DU), or a user equipment (UE) to change an activation status of at least one cell; and
   switching the UE from a first cell to a second cell in connection with the change to the activation status of the at least one cell, wherein the first cell corresponds to a first DU and the second cell corresponds to a second DU, and wherein the first DU and the second DU have respective medium access control and radio link control entities and common packet data convergence protocol, radio resource control protocol, and service data adaptation protocol entities, wherein the at least one cell is included in an L1/L2 activated cell set of the first DU or the second DU or an L1/L2 deactivated cell set of the first DU or the second DU.

27. The method of claim 26, wherein the wireless communication device is one of the CU, the DU, another DU, or the UE.

28. The method of claim 26, further comprising:
communicating, using further L1/L2 signaling, to select a beam for the UE.

29. A user equipment (UE) for wireless communication, comprising:
one or more memories; and
one or more processors coupled to the one or more memories, the one or more processors configured to:
determine to switch from a first cell of a first distributed unit (DU) to a second cell of a second DU, wherein the first DU and the second DU are included in a set of DUs of a central unit (CU), and wherein the first DU and the second DU have respective medium access control and radio link control entities and common packet data convergence protocol, radio resource control protocol, and service data adaptation protocol entities;
communicate, using layer 1 (L1) or layer 2 (L2) signaling, with at least one of the first DU or the second DU to change an activation status of at least one cell of the first DU or the second DU based at least in part on determining to switch from the first cell to the second cell, wherein the at least one cell is included in an L1/L2 activated cell set of the first DU or the second DU or an L1/L2 deactivated cell set of the first DU or the second DU; and
switch from the first cell to the second cell in connection with the change to the activation status of the at least one cell of the first DU or the second DU.

30. A wireless communication device for wireless communication, comprising:
one or more memories; and
one or more processors coupled to the one or more memories, the one or more processors configured to:
communicate, using layer 1 (L1) or layer 2 (L2) signaling, with at least one of a central unit (CU), a distributed unit (DU), or a user equipment (UE) to change an activation status of at least one cell; and
switch the UE from a first cell to a second cell in connection with the change to the activation status of the at least one cell, wherein the first cell corresponds to a first DU and the second cell corresponds to a second DU, and wherein the first DU and the second DU have respective medium access control and radio link control entities and common packet data convergence protocol, radio resource control protocol, and service data adaptation protocol entities, wherein the at least one cell is included in an L1/L2 activated cell set of the first DU or the second DU or an L1/L2 deactivated cell set of the first DU or the second DU.

* * * * *